US008189550B2

(12) United States Patent
Hara et al.

(10) Patent No.: US 8,189,550 B2
(45) Date of Patent: May 29, 2012

(54) RADIO COMMUNICATION DEVICE, RADIO COMMUNICATION METHOD AND RADIO RECORDING MEDIUM

(75) Inventors: Yasushi Hara, Kawasaki (JP); Youichi Kondou, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 525 days.

(21) Appl. No.: 12/412,872

(22) Filed: Mar. 27, 2009

(65) Prior Publication Data

US 2009/0247158 A1  Oct. 1, 2009

(30) Foreign Application Priority Data

Mar. 28, 2008 (JP) ................................. 2008-088021
Mar. 20, 2009 (JP) ................................. 2009-069204

(51) Int. Cl.
*H04W 4/00* (2009.01)
(52) U.S. Cl. ........................................ 370/338; 370/465
(58) Field of Classification Search .................. 370/230, 370/230.1, 231, 235, 328–329, 331, 335–336, 370/338, 341–343, 345, 347–348, 437, 465–466
See application file for complete search history.

(56) References Cited

U.S. PATENT DOCUMENTS

| 7,319,715 B1 * | 1/2008 | Souissi et al. ................. 375/220 |
| 7,639,712 B2 * | 12/2009 | Un et al. ....................... 370/469 |
| 7,710,984 B2 * | 5/2010 | Dunk ............................. 370/400 |
| 2006/0020446 A1 * | 1/2006 | Hamby et al. ..................... 704/9 |
| 2007/0161401 A1 * | 7/2007 | Sheynblat ................... 455/553.1 |

FOREIGN PATENT DOCUMENTS

| JP | 10-41970 | 2/1998 |
| JP | 2004-48550 | 2/2004 |
| JP | 2004-88154 | 3/2004 |
| JP | 2007-251304 | 9/2007 |

* cited by examiner

*Primary Examiner* — Chi H. Pham
*Assistant Examiner* — Kevin Mew
(74) *Attorney, Agent, or Firm* — Staas & Halsey LLP

(57) ABSTRACT

A radio communication method for a radio communication device having a first communication unit and a second communication unit includes determining whether a connection between the radio communication device and a local-area radio network is in a difficult state while the radio communication device is connected to the local-area radio network by the second communication unit, obtaining position information through the started first communication unit, reading out communication set information recorded with the obtained position information that records communication set information, and the position information obtained from the base station at a position connectable to the local-area radio network associated with the communication set information relating with each other, and detecting a connectable local-area radio network based on the read communication set information when the communication determination unit determines that a connection between the radio communication device and a local-area radio network is in the difficult state.

10 Claims, 20 Drawing Sheets

FIG. 4

| POSITION INFORMATION | COMMUNICATION SET INFORMATION |
|---|---|
| A | Profile 01 |
| A | Profile 02 |
| B | Profile 03 |
| B | Profile 04 |
| B | Profile 05 |

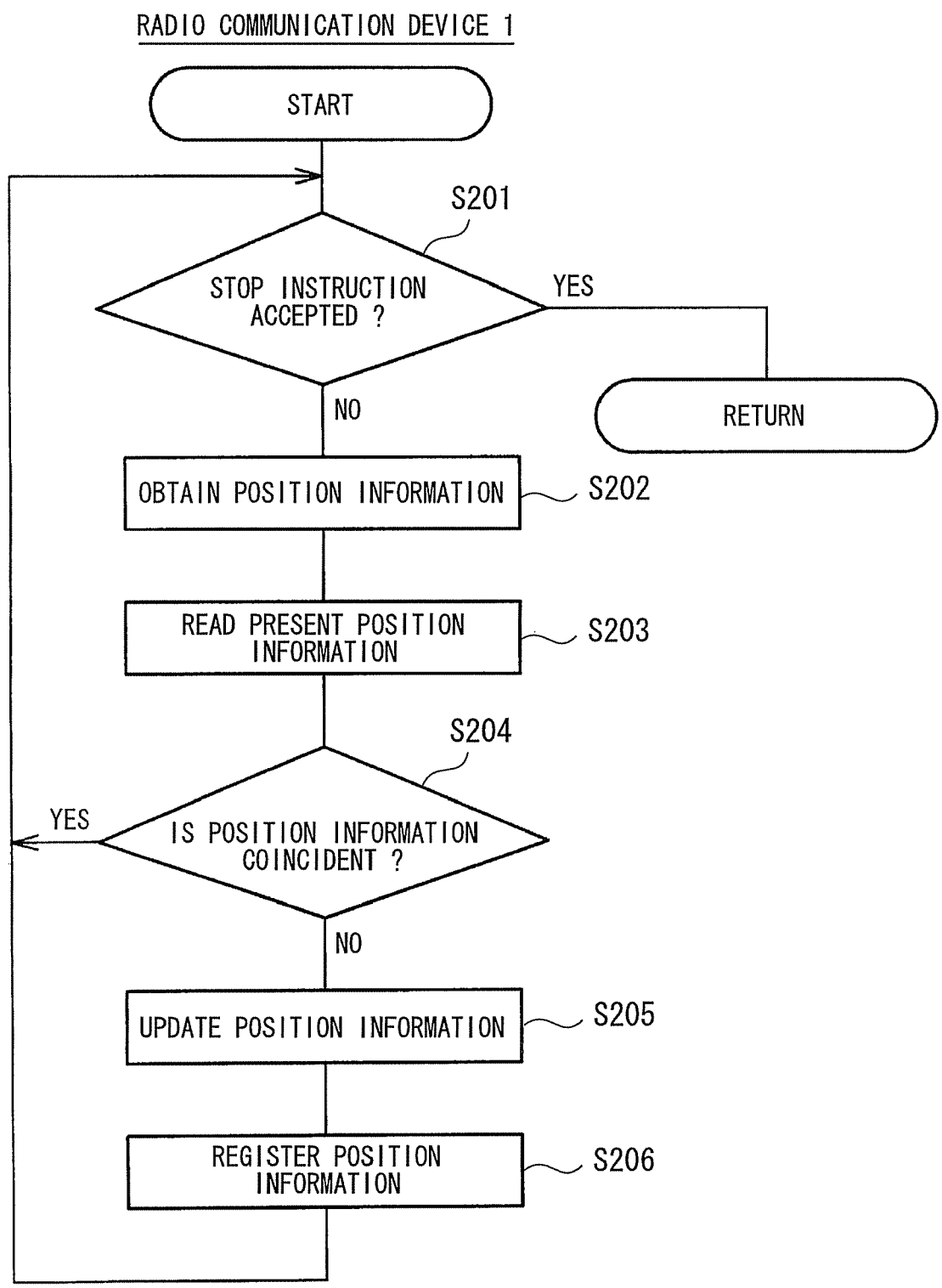

FIG. 10

| POSITION INFORMATION | COMMUNICATION SET INFORMATION | CHANNEL INFORMATION |
|---|---|---|
| A | Profile01 | ch1, ch6, ch11, ch14 |
| A | Profile02 | ch1, ch6 |
| B | Profile03 | ch1, ch6, ch11, ch14 |
| B | Profile04 | ch14 |
| B | Profile05 | ch1, ch6, ch11, ch14 |

FIG. 14A

| POSITION INFORMATION | COMMUNICATION SET INFORMATION |
|---|---|
| A | Profile01 |
| A | Profile02 |
| B | Profile03 |
| | |

FIG. 14B

| POSITION INFORMATION | COMMUNICATION SET INFORMATION |
|---|---|
| A | Profile01 |
| A | Profile02 |
| B | Profile01 |
| B | Profile04 |
| | |

RADIO COMMUNICATION DEVICE, RADIO COMMUNICATION METHOD AND RADIO RECORDING MEDIUM

CROSS-REFERENCE TO RELATED APPLICATIONS

This application is based upon and claims the benefit of priority of the prior Japanese Patent Application No. 2008-088021, filed on Mar. 28, 2008, and the prior Japanese Patent Application No. 2009-69204, filed on Mar. 20, 2009, the entire contents of which are incorporated herein by reference.

BACKGROUND

1. Field

Various embodiments of the present invention relate to a radio communication device having a first communication unit connected to a board-band radio network through a base station and a second communication unit connected to a local-area radio network through a fixed station, a radio communication method using the radio communication device and a radio communication program for implementing the radio communication device.

2. Description of the Related Art

Radio communication devices such as cellular phones, etc., each of which is connectable to a wide-area radio network, such as a public cellular phone network, and a local-area network, such as WLAN (Wireless Local Area Network) or the like, have been developed. For example, devices such as FMC (Fixed Mobile Convergence) terminal, a dual terminal, etc. are known (for example, JP-A-10-41970). The radio communication devices such as the dual terminal, etc. are used in various methods in which communications associated with public affairs such as business, etc. are executed by connecting the radio communication device to a local-area radio network and also communications associated with private affairs other than the business are executed by connecting the radio communication device to a wide-area radio network.

Such a radio communication device can execute communications through the local-area radio network such as data communication, voice communication based on VoIP (Voice Over Internet Protocol), etc. in a communication range of a fixed station serving as an access point of the local-area radio network. When the radio communication device is located with the communication range of the local-area radio network, the radio communication device executes communication such as data communication, voice-communication based on VoIP or the like, and also executes the processing of receiving a signal called as beacon transmitted from a fixed station of the local-area radio network when the radio communication device does not execute any communication such as data communication, voice-communication or the like. On the other hand, when the radio communication device is located outside the communication range of the local-area radio network, the radio communication device executes a scanning operation of detecting a connectable local-area radio network. The scanning operation of the connectable local-area radio network is executed on communication set information such as a radio LAN profile representing communication setting associated with a pre-recorded local-area radio network or the like. Furthermore, the radio communication device is connected to a wide-area communication network, and executes communication such as data communication, voice communication as a cellular phone or the like.

As described above, the radio communication device such as the dual terminal or the like can be used in a dual mode in which both the processing associated with the local-area radio network and the processing associated with the wide-area radio network are executed. The radio communication device such as the dual terminal or the like can be also used in a single mode in which the processing associated with only one of the communication networks is executed and the processing associated with the other communication network is stopped. When the radio communication device is used in the single mode, there is an advantage that the power consumption can be more greatly suppressed as compared with the case where it is used in the dual mode.

SUMMARY

A radio communication device, includes a first communication unit transmitting position information associated with a position of the radio communication device, the first communication unit being connected to a wide-area radio network through a base station; a second communication unit connecting to a local-area radio network through a fixed station based on communication set information representing a communication setting associated with the local-area radio network; a recording unit recording communication set information and position information obtained from the base station at a position connectable to a local-area radio network associated with the communication set information in association with each other; an operation controller controlling operation or stop of the first communication unit and the second communication unit; a communication determination unit determining whether a connection between the radio communication device and a local-area radio network is in a difficult state while the radio communication device operates in a communication mode in which the radio communication device is connected to the local-area radio network by the second communication unit; a position information obtaining unit obtaining position information from a communication-possible base station through the first communication unit that is started up by the operation controller; a communication setting reading unit reading out communication set information recorded in the recording unit in association with the position information obtained by the position information obtaining unit; and a scanning unit detecting a connectable local-area radio network based on the communication set information read out by the communication setting reading unit when the communication determination unit determines that a connection between the radio communication device and a local-area radio network is in the difficult state.

A radio communication device includes a first communication unit transmitting position information associated with a position of the radio communication device, the first communication unit being connected to a wide-area radio network through a base station; a second communication unit connecting to a local-area radio network through a fixed station based on communication set information representing a communication setting associated with the local-area radio network; a recording unit recording communication set information and position information obtained from the base station at a position connectable to a local-area radio network associated with the communication set information in association with each other; an operation controller controlling operation or stop of the first communication unit and the second communication unit; a communication determination unit determining whether a connection between the radio communication device and a local-area radio network is in a difficult state while the radio communication device operates in a communication mode in which the radio communication device is connected to the local-area radio network by the second communication unit; a position information obtaining unit for obtaining the position information recorded in the recording unit in association with the communication set information associated with the connected local-area radio network; a communication setting reading unit reading out communication set information recorded in the recording unit in association with the position information obtained by the position information obtaining unit; and a scanning unit for detecting a connectable local-area radio network based on the communication set information read out by the communication setting reading unit when the communication determination unit determines that a connection between the radio communication device and a local-area radio network is in the difficult state.

BRIEF DESCRIPTION OF DRAWINGS

FIG. 4 illustrates an explanatory diagram of the recording content of a communication table of the radio communication device according to the first embodiment.

FIG. 8 illustrates a flowchart of the processing associated with a first communication unit of the radio communication device according to the first embodiment.

FIG. 10 illustrates an explanatory diagram of the recording content of a communication table of the radio communication device according to a second embodiment.

FIG. 14A illustrates an explanatory diagram of the recording content of a communication table of a radio communication device according to a third embodiment.

FIG. 14B illustrates an explanatory diagram of the recording content of a communication table of a radio communication device according to a third embodiment.

DESCRIPTION OF EMBODIMENTS

First Embodiment

Figure 1:
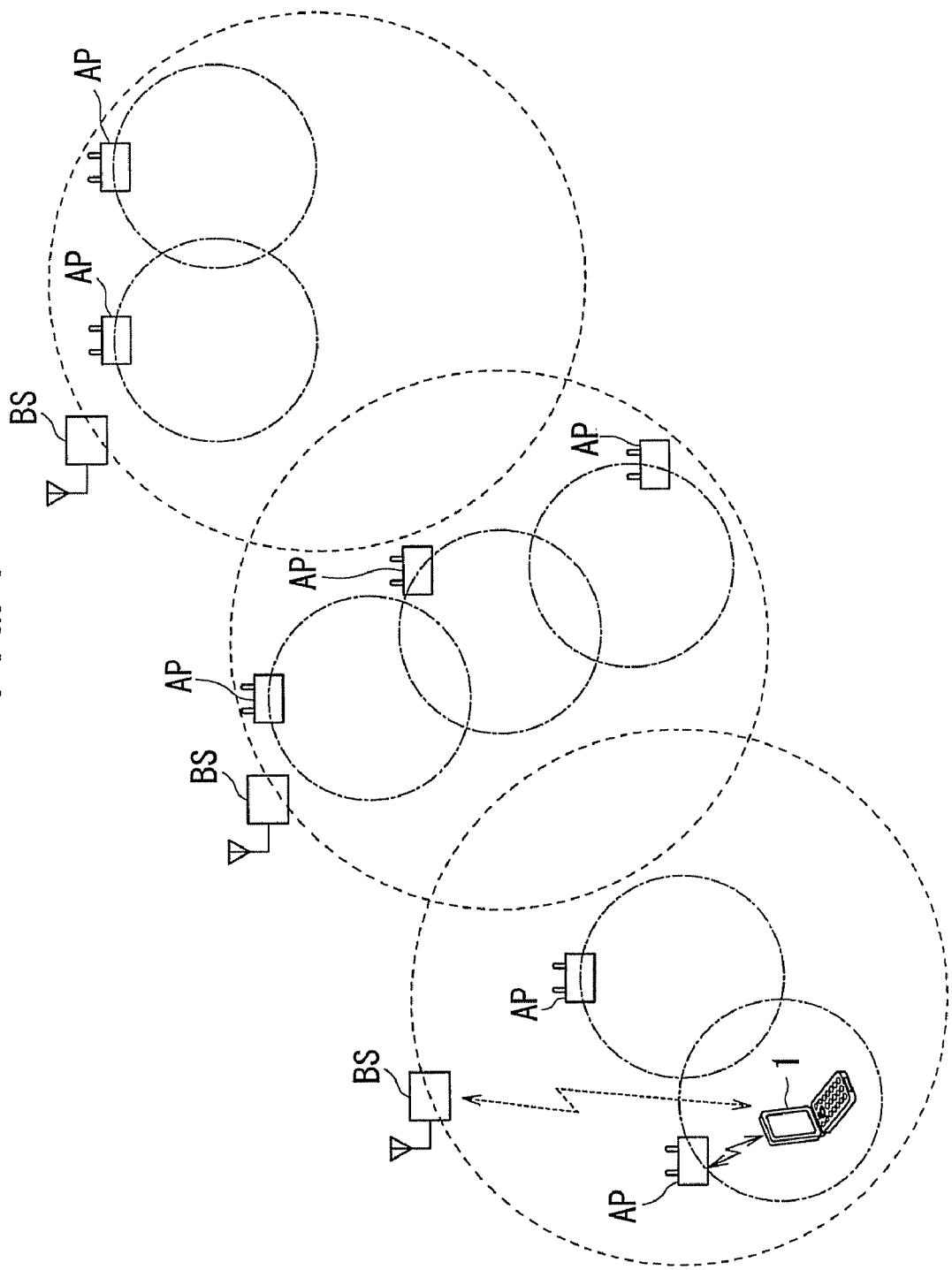
FIG. 1 illustrates an explanatory diagram of a radio communication device according to a first embodiment.

FIG. 1 is a diagram of a radio communication device according to a first embodiment. The radio communication device 1 is able to communicate to a wide-area radio network such as a public cellular phone (mobile phone) network or the like through base stations BS to execute communication such as data communication, cellular phone communication or the like. Furthermore, the radio communication device 1 is able to communicate to a local-area radio network such as WLAN (Wireless Local Area Network) or the like through fixed stations serving as access points to execute data communication, voice-communication based on VoIP (Voice over Internet Protocol). The communication range of the wide-area radio network that is formed by the base stations BS is larger than the communication range of the local-area radio network formed by the fixed stations AP. As described above, according to the present invention, the wide-area radio network is a public radio network to which unspecific devices can connect, and the local-area radio network is a dedicated radio network such as in-house WLAN or the like to which only specific devices can connect. However, a public radio network that is set up in the city and connected through a fixed station AP called as a hot point.

Each of the base stations BS transmits position information associated with the set position thereof. The radio communication device 1 executes the reception processing of the position information at a predetermined time interval of 2.56 seconds or the like by the communication regulation of the cellular communication system or the like. When received position information indicates a position different from recorded position information, the radio communication device 1 updates the recorded position information, and registers the radio communication device 1 into a management device (not shown) connected to the wide-area radio network.

The radio communication device 1 records communication set information (profile information) such as a wireless LAN profile representing communication setting associated with the local-area radio network, etc., executes a scanning operation to detect a connectable local-area radio network based on the recorded communication set information and connects to the detected local-area radio network to execute communications. The communication set information such as the wireless LAN profile, etc. contains information such as a profile name, SSID (Service Set Identifier), a communication standard, a mode, a channel, a ciphering method, etc.

The radio communication device 1 is usable in the dual mode in which both the processing associated with the local-area radio network and the processing associate with the wide-area radio network are executed. Furthermore, the radio communication device 1 is also usable in the single mode in which only the processing associated with one communication network is executed, and the processing associated with the other communication network is stopped.

Figure 2:
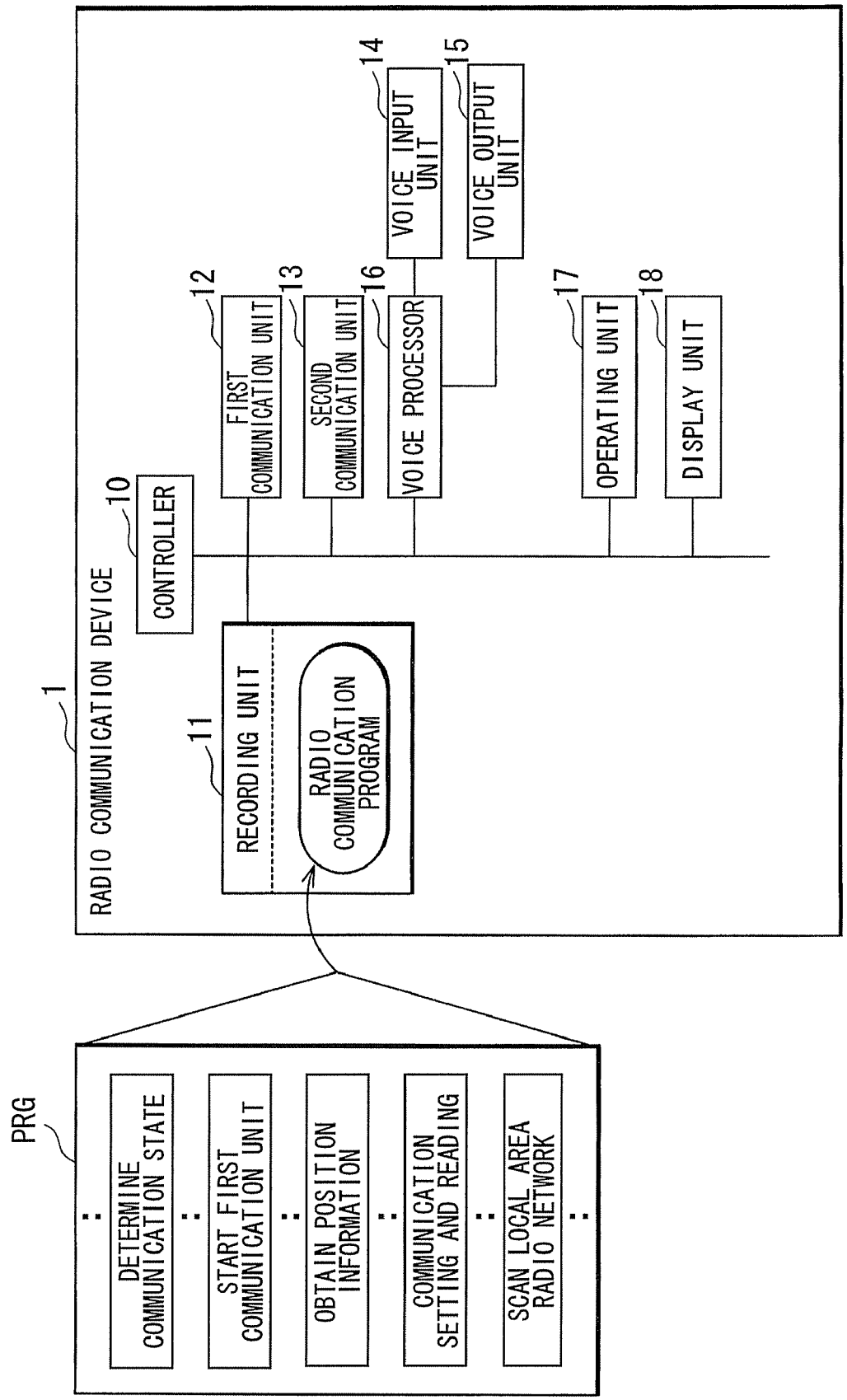
FIG. 2 illustrates a block diagram of the hardware construction of the radio communication device according to the first embodiment.

The construction of the radio communication device 1 according to the first embodiment of the present invention will be described. FIG. 2 is a block diagram of the hardware construction of the radio communication device 1 according to the first embodiment of the present invention. The radio communication device 1 has a controller 10, a recording unit 11, a first communication unit 12, a second communication unit 13, a voice input unit 14, a voice output unit 15, a voice processor 16, an operating unit 17 and a display unit 18.

The controller 10 is constructed by using a circuit such as a CPU to control the whole device or the like, for example. The recording unit 11 is constructed by using a memory such as ROM, RAM or the like, for example, and records information such as various kinds of control programs such as a radio communication program PRG, etc., various kinds of data, etc. The radio communication device 1 executes the radio communication program PRG of the present invention stored in the recording unit 11 under the control of the controller 10, thereby functioning the radio communication device 1. The radio communication device 1 according to the present invention may be designed as hardware using various kinds of circuits insofar as it implements various kinds of functions described later.

The first communication unit 12 is constructed by using an antenna and an appendant circuit for executing the processing associated with the communication thereof, and has a function of executing the communication processing while connected to the wide-area radio network. The second communication unit 13 is constructed by an antenna and an appendant circuit for executing the communication thereof, and has a function of executing the communication processing while connected to the local-area radio network.

The voice input unit 14 is constructed by a microphone and an appendant circuit thereof, and it receives external sound such as user's voice or the like and converts the sound to an audio signal. A voice output unit 15 is constructed by a speaker and an appendant circuit thereof, and has a function of outputting the sound based on the audio signal, etc. The voice processor 16 is constructed by a circuit such as a voice processing circuit or the like, and executes various kinds of processing associated with audio signals such as an audio signal based on the sound received by the voice input unit 14, an audio signal as a base of the sound to be output from the voice output unit 15.

The operating unit 17 is constructed by members such as ten keys, various kinds of function keys, etc. and an appendant circuit thereof, and has a function of accepting a user's operation. The display unit 18 is constructed by using a liquid crystal monitor and an appendant circuit, for example, and it displays various kinds of information as images.

Figure 3:
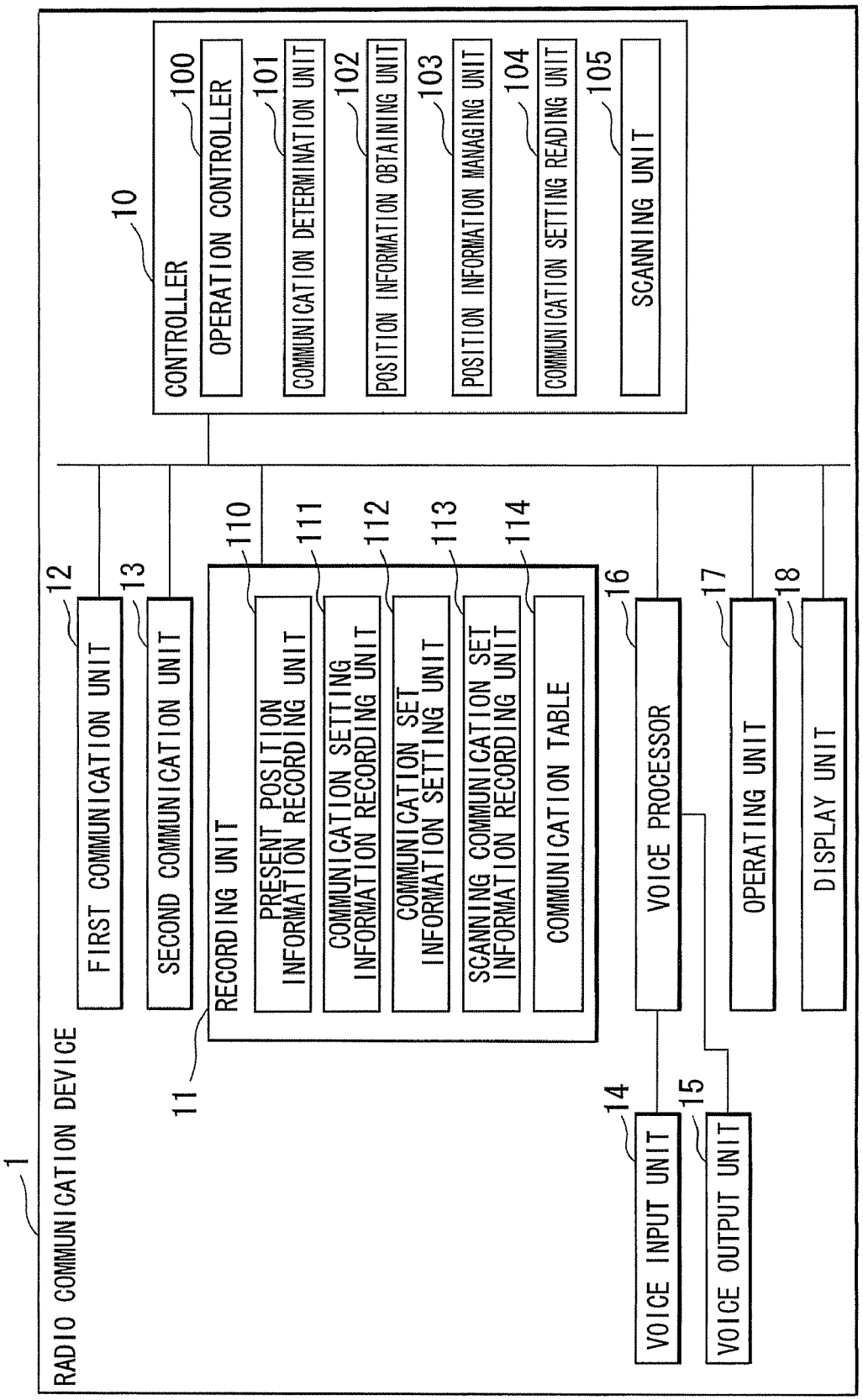
FIG. 3 illustrates a functional block diagram of the functional construction of the radio communication device according to the first embodiment.

FIG. 3 is a functional block diagram of the functional construction of the radio communication device 1 according to the first embodiment of the present invention. The radio communication device 1 executes the control program such as the radio communication program PRG or the like of the present invention that is stored in the recording unit 11, thereby actuating the functions of an operation controller 100, a communication determination unit 101, a position information obtaining unit 102, a position information managing unit 103, a communication setting and reading unit 104, a scanning unit 105, etc.

The operation controller 100 is a program module for controlling operation/stop of the first communication unit 12 and the second communication unit 13. For example, when the radio communication device 1 is used in the dual mode, the operation controller 100 controls to distribute power to both the first communication unit 12 and the second communication unit 13, thereby operating the first communication unit 12 and the second communication unit 13. For example, when the radio communication device 1 is used in the single mode in which only the second communication unit 13 is operated, the operation controller 100 interrupts power distribution to the first communication unit 12 to thereby stop the first communication unit 12, and also distributes power to the second communication unit 13 to operate the second communication unit 13.

The communication determination unit 101 is a program module for determining whether the communication with the local-area radio network in the radio communication device 1 is in difficult state. For example, When the radio communication device can not communicate with the local-area radio communication because the radio communication device secedes from the communication range of the local-area radio communication, the communication determination unit 101 determines that the communication with the local-area radio network in the radio communication device 1 is in difficult state.

The position information obtaining unit 102 is a program module for obtaining position information transmitted from the base stations BS of the wide-area radio network through the first communication unit 12 at a predetermined time interval of 2.56 seconds or the like.

The position information managing unit 103 is a program module for collating the position information obtained by the position information obtaining unit 102 with the position information recorded in the recording unit 11, and updating the position information recorded in the recording unit when the obtained position information indicates a position different from the recorded position information. When the obtained position information and the recorded position information indicate the same position, the position information managing unit 103 does not update the position information. Furthermore, when the obtained position information and the recorded position information indicate different positions, the position information managing unit 103 transmits the obtained position information to a managing device (not shown) connected to the wide-area radio network, and executes the registration processing of the position information at the managing device.

The communication setting and reading unit 104 is a program module for reading the communication set information recorded in the recording unit 11.

The scanning unit 105 is a program module for executing a scanning operation to detect a connectable local-area radio network on the basis of the communication set information.

The radio communication device 1 executes the control program such as the radio communication program PRG or the like of the present invention that is recorded in the recording unit 11, whereby the recording unit 11 is usable as an information recording area such as a present position information recording unit 110, a communication set information recording unit 111, a communication set information setting unit 112, a scanning communication set information recording unit 113, a communication table 114 or the like, or a data table.

Position information representing the present position of the radio communication device 1 is recorded in the present position information recording unit 110. The position information representing the present position of the radio communication device 1 is position information obtained from the base station BS of the wide-area radio network. In the following description, codes such as "A", "B", etc. are used as the position information. That is, the present position information recording unit 110 is an information recording area in which position information on the position of the base station BS to be connected from the present position of the radio communication device 1 is recorded.

The communication set information recording unit 111 is an information recording area for recording communication set information (profile information) such as "Profile01", "Profile02", etc. representing the respective communication settings of the respective fixed stations AP of the local-area radio network to which the radio communication device 1 can be connected. The communication set information is automatically detected by receiving electrical waves transmitted from the fixed stations AP through the processing of the second communication unit 13. The detected communication set information is registered into the communication set information recording unit 111 by a user's operation or automatically. Furthermore, the communication set information registered in the communication set information recording unit 111 is recorded in association with the position information into the communication table by a user's operation or automatically.

The communication set information setting unit 112 is an information recording area for recording the setting of the communication set information of a fixed station AP to be connected from the present position of the radio communication device 1.

When the radio communication device 1 is outside of the communication range of the local-area radio network to be connected, the scanning communication set information recording unit 113 is an information recording area for recording communication set information required for the scanning operation to connect to the local-area radio network.

The communication table 114 is a table for recording communication set information associated with the local-area radio network. A specific example of the recording content of the communication table 114 will be described. FIG. 4 is a diagram of the recording content of the communication table 114 of the radio communication device 1 according to the first embodiment of the present invention. Communication set information such as "Profile01", "Profile02", etc. is recorded on a record basis in association with the position information of "A", "B", etc. associated with the base stations BS constituting the wide-area radio network in the communication table 114. The corresponding relationship between the communication set information and the position information is based on the positional relationship between the local-area radio network and the wide-area radio network. For example, the record of the most significant record illustrated in FIG. 4 indicates that the radio communication device 1 can be connected to the local-area radio communication network on the basis of the communication set information "Profile01", and also connected to the wide-area radio network through the base station BS as "A".

Next, the processing associated with the first communication unit 12 of the radio communication device 1 according to the first embodiment will be described. A condition that the radio communication device 1 secedes from the communication range of the fixed station AP with which the radio communication device 1 communicates will be described.

Figure 5:
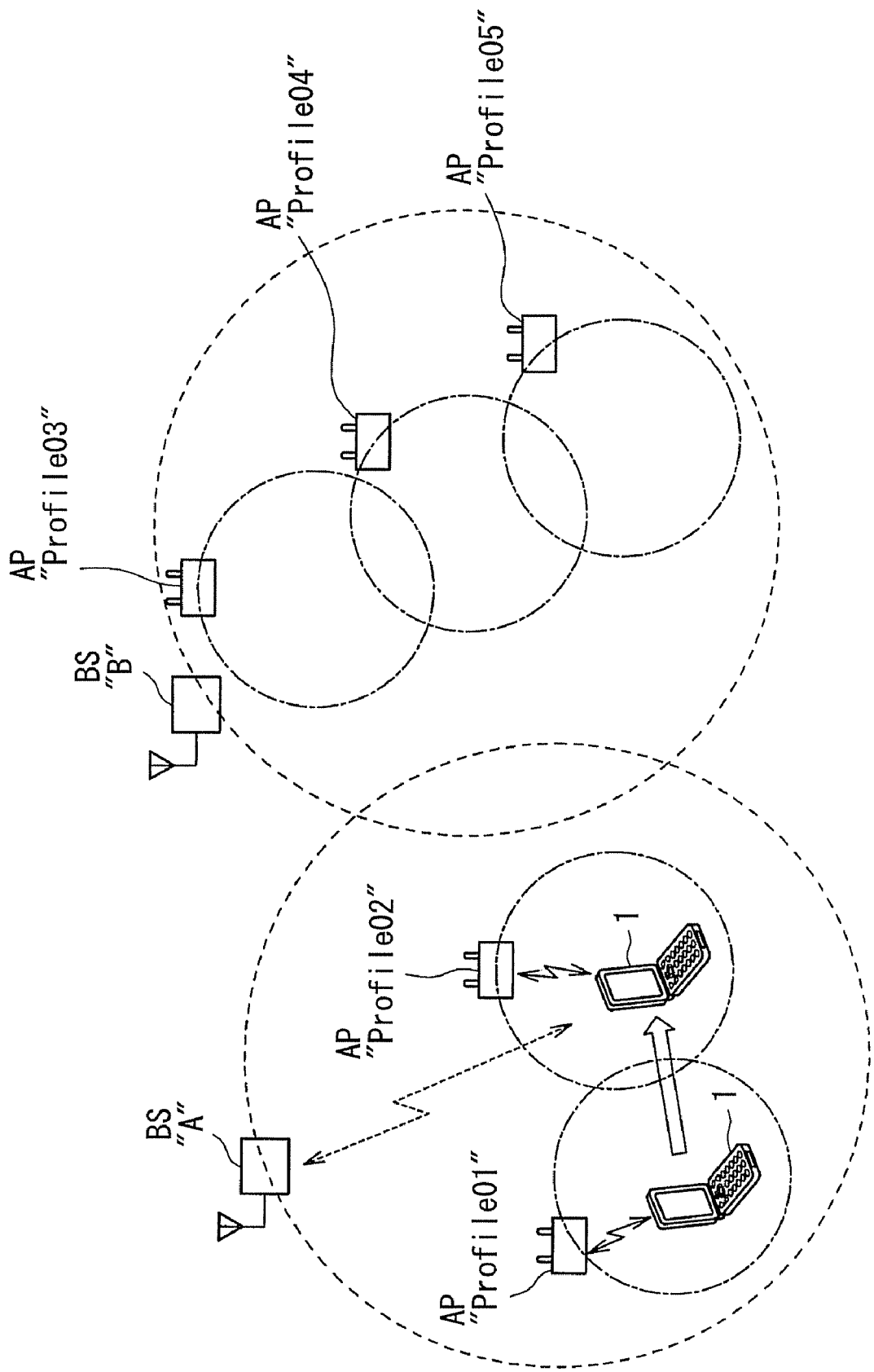
FIG. 5 illustrates an explanatory diagram of a condition under which the communication processing of the radio communication device according to the first embodiment is executed.

FIG. 5 is a diagram of the condition under which the communication processing of the radio communication device 1 according to the first embodiment is executed. In FIG. 5, circles indicated by broken lines represent communication ranges of the base stations BS constituting the wide-area radio network, and the symbols of "A", "B", etc. represent the position information associated with the base stations BS. Furthermore, in FIG. 5, circles indicated by one-dotted chain lines represent communication ranges of the fixed stations AP constituting the local-area radio network, and the symbols of "Profile01", "Profile02", etc. represent communication ranges of the fixed stations AP. The processing of the radio communication device 1 according to the first embodiment that will be described below is executed under the condition that the radio communication device 1 secedes from the communication range of the fixed station AP indicated by "Profile01" illustrated in FIG. 5.

Figure 6:
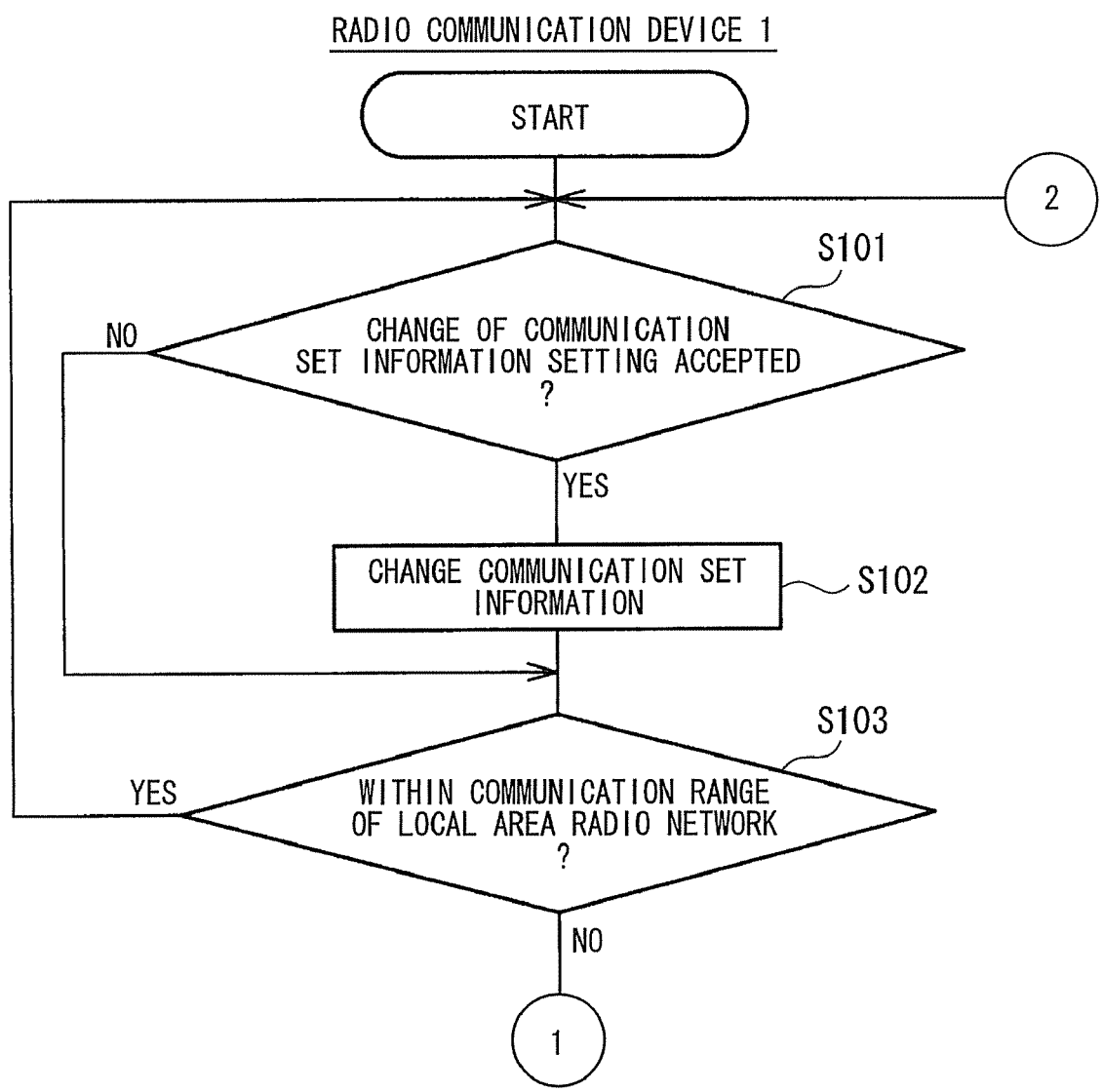
FIG. 6 illustrates a flowchart of the processing associated with a second communication unit of the radio communication device according to the first embodiment.
Figure 7:
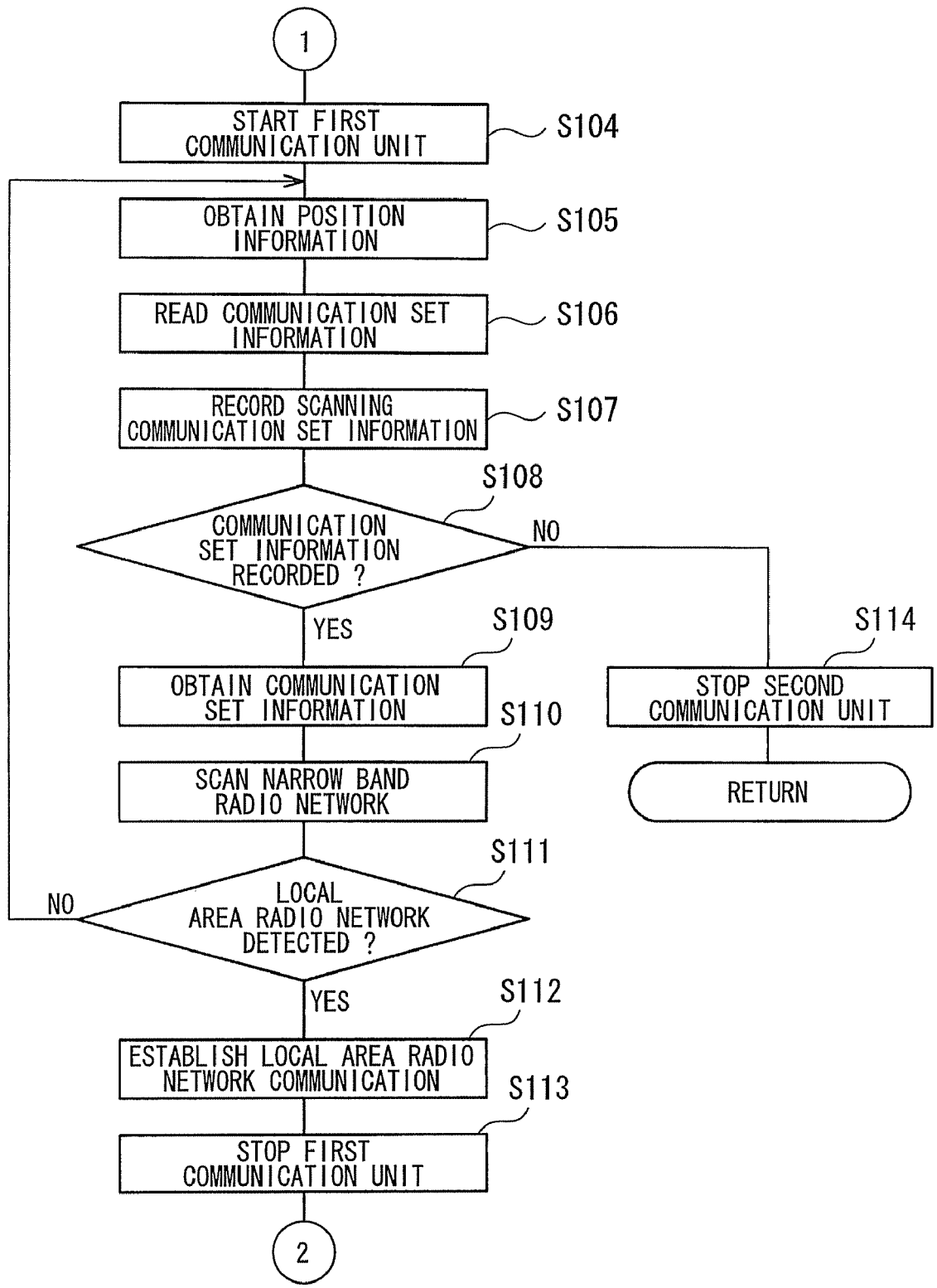
FIG. 7 illustrates a flowchart of the processing associated with the second communication unit of the radio communication device according to the first embodiment.

FIGS. 6 and 7 are flowcharts of the processing associated with the second communication unit 13 of the radio communication device 1 according to the first embodiment of the present invention. The radio communication device 1 operates in the single mode in which the radio communication device 1 stops the first communication unit 12 and connects to the local-area radio network through the second communication unit 13. The processing of the second communication unit 13 when the radio communication device 1 operates will be described. Under the control of the controller 10 for executing the radio communication program PRG recorded in the recording unit 11, the radio communication device 1 determines, as the processing associated with the second communication unit 13, whether change of the setting of the communication set information associated with the fixed station AP of the present local-area radio network to be connected is accepted or not (S101). The communication set information associated with the fixed AP of the present local-area radio network to be connected is communication set information recorded in the communication set information setting unit 112. In step S101, by referring to the communication set information recording unit 111, it is determined whether the setting of the communication set information recorded in the communication set information setting unit 112 is changed or not.

If it is determined in step S101 that the change of the setting is accepted (S101: Yes), the radio communication device 1 sets the change of the communication set information to the accepted change content under the control of the controller 10 (S102). In step S102, the processing of changing the communication set information setting unit 112 is executed on the basis of the changed setting recorded in the communication setting information recording unit 111. In step S101, it is determined that the change of the setting is not accepted (S101: NO), the processing of step S102 is not executed.

Furthermore, through the processing of the determination unit 101 based on the control of the controller 10, the radio communication device 1 determines whether the communication with the local-area radio network in the radio communication device 1 is in difficult state. For example, the radio communication device 1 determines on the basis of the set communication set information whether it is not within the communication range of the local-area radio network associated with the fixed station AP to which it is connected (S103).

In step S103, when it is determined that the radio communication device 1 is within the communication range (i.e. when it is determined that the communication with the local-area radio network is not in difficult state) (S103: YES), the radio communication device 1 returns to the step S101 and repeats the processing of the subsequent steps under the control of the controller 10. In step S103, when it is determined that the radio communication device 1 is within the communication range, the radio communication device 1 continues the communication based on the communication set information being currently set. Before returning to the step S101, the processing may be on standby for a predetermined time.

If it is determined in step S103 that the radio communication device 1 is outside the communication range (i.e. when it is determined that the communication with the local-area radio network is in difficult state) (S103: NO), the radio communication device 1 activates the stopped first communication unit 12 through the processing of the operation controller 100 based on the control of the controller 10 (S104). The activation of the first communication unit 12 is executed by distributing power to the first communication unit 12. Furthermore, by activating the first communication unit 12, the execution of the processing associated with the first communication unit 12 is started in parallel to the processing associated with the second communication unit 13. The processing associated with the first communication unit 12 will be described later.

Under the control of the controller 10, the radio communication device 1 obtains the position information representing the present position recorded in the present position information recording unit 110 (S105). The position information representing the present position recorded in the present position information recording unit 110 represents the present position of the radio communication device 1, and it is recorded and updated through the processing associated with the first communication unit 12. In the example illustrated in FIG. 5, if the radio communication device 1 is located at a position just after it secedes from the communication range of the fixed station AP indicated by "Profile01", the position information "A" is obtained. Accordingly, the present position information is obtained from the base station BS of the wide-area radio communication network, and only the communication set information of the local-area radio communication network associated with the position information can be set as a scanning target. As a result, the scanning operation can be reduced, and the power consumption can be expected to be reduced.

Through the processing of the communication setting and reading unit 104 based on the control of the controller 10, the radio communication device 1 reads the communication set information (profile information) recorded in the recording unit 11 in association with the obtained position information (S106), and records it into the scanning communication set information recording unit 113 (S107). In step S106, the radio communication device 1 refers to the communication table 114 to execute the processing of reading the communication set information corresponding to the position information obtained from the present position information recording unit 110. The read-out communication set information is recorded (set) into the scanning communication set information recording unit 113 of the recording unit 11 as communication set information (scan profile) as a scan target when the radio communication device 1 is outside the communication range of the local-area radio network. Accordingly, only the communication set information (profile information) as scan targets can be collectively stored in the scanning communication set information recording unit 113. The scanning processing may be executed by referring to only the communication set information set in the scanning communication set information recording unit 113, so that the efficiency of the scanning processing can be enhanced and thus it is expected to reduce the power consumption, etc.

Through the processing of the communication setting and reading unit 104 based on the control of the controller 10, the radio communication device 1 determines whether the communication set information (scan profile) as a scan target is recorded in the scanning communication set information recording unit 113(S108). When the communication set information corresponding to the position information is not recorded in the communication table 114 in step S106, the communication set information as the scan target is not recorded in step S108.

When it is determined in step S108 that the communication set information is recorded (S108: YES), the radio communication device 1 obtains the communication set information as the scan target through the processing of the communication setting and reading unit 104 based on the control of the controller 10 (S109). In step S109, the processing of obtaining the content of the communication set information recorded in the scanning communication set information recording unit 113 from the communication set information recording unit 111 is executed.

Through the processing of the scanning unit 105 based on the control of the controller 10, the radio communication device 1 executes the scanning operation to detect a connectable local-area radio network on the basis of the obtained communication set information (S110). Through the processing of the scanning unit 105 based on the control of the controller 10, the radio communication device 1 determines whether a connectable local-area radio network can be detected or not (S111).

When it is determined in S111 that a connectable local-area radio network can be detected (S111: YES), the radio communication device 1 establishes the communication with the fixed station AP associated with the detected local-area radio network under the control of the controller 10 (S112). In step S112, the recording content of the communication set information setting unit 112 is updated to the communication set information associated with the detected local-area radio network to perform the setting on the communication, and the radio communication device 1 is connected to the local-area radio network through the second communication unit 13 on the basis of the set communication set information.

Through the processing of the operation controller 100 based on the control of the controller 10, the radio communication device 1 stops the first communication unit 12 (S113), and returns the processing to the step S101 to repeat the subsequent processing. The stop of the first communication unit 12 of the step S113 is executed by interrupting the power distribution to the first communication unit 12. Furthermore, in connection with the stop of the first communication unit 12, the radio communication device notifies a stop instruction for the processing associated with the first communication unit 12 that is executed in parallel to the processing associated with the second communication unit 13, and also stops the processing associated with the first communication unit 12. Accordingly, the radio communication device 1 gets out of the local-area radio network, temporarily scans while optimizing the number of local-area radio networks to be scanned by using the wide-area radio network, and stops the first communication unit 12 to communicate with the wide-area radio network again when the radio communication device 1 can communicate with the local-area radio network, whereby the radio communication device 1 is set to the single mode state under which only the second communication unit 13 communicating with the original local-area radio network is executed.

When it is determined in step S108 that no communication set information is recorded (S108: NO), that is, when the connection to the local-area radio communication network based on the communication set information cannot be established, the radio communication device 1 stops the second communication unit 13 under the control of the operation controller 100 based on the control of the controller 10 (S14), and finishes the processing. The stop of the second communication unit 13 of the step S114 is executed by interrupting the power distribution to the second communication unit 13. When the second communication unit 12 is stopped in step S114, the recording content of the communication set information setting unit 112 is deleted. The processing may be returned to step S101 or S105 to repeat the subsequent processing without stopping the second communication unit 13 in step S114. In this case, the repeating frequency may be limited. Accordingly, when the there exists no local-area radio communication network associated with the wide-area radio communication network, the scanning operation can be omitted, and thus needless power consumption can be expected to be efficiently suppressed.

When it is impossible to detect any connectable local-area radio network in step S111 (S111: NO), the radio communication device 1 returns to step S105 to repeat the subsequent processing under the control of the controller 10. The subsequent processing to the step S109 and subsequent steps may be repeated. Accordingly, even when the radio communication device 1 moves among plural base stations BS while using a public radio network, in accordance with the situation, the local-area radio network associated with the base station BS is scanned or the scanning of the local-area radio network is stopped if they are not associated with each other, so that it is expected to efficiently suppress needless power consumption.

FIG. 8 is a flowchart of the processing associated with the first communication unit 12 of the radio communication device 1 according to the first embodiment of the present invention. The processing associated with the first communication unit 12 activated in the step S104 of the processing associated with the second communication unit 13 described with reference to FIGS. 6 and 7 will be described. Under the control of the controller 10 for executing the radio communication program PRG recorded in the recording unit 11, the radio communication device 1 determines, as the processing associated with the first communication unit 12, whether a stop instruction is accepted or not (S201). The stop instruction of the step S201 is a stop instruction that is notified in connection with the stop of the step S113 of the processing associated with the second communication unit 13.

When it is determined in step S201 that no stop instruction is accepted (S201: NO), the radio communication device 1 obtains the position information from the base station BS of a communication-possible wide-area radio communication network through the processing of the position information obtaining unit 102 based on the control of the controller 10 (S202). The achievement of the position information of the step S202 corresponds to the processing of obtaining the position information received in the reception processing of the position information which is executed at a predetermined time interval of 2.56 second or the like.

The radio communication device 1 reads the recorded position information representing the present position from the present position information recording unit 110 through the processing of the position information managing unit 103 based on the control of the controller 10 (S203).

Through the processing of the position information managing unit 103 based on the control of the controller 10, the radio communication device 1 determines whether the position information obtained in step S202 is coincident with the position information read out in step S203 (S204).

When it is determined in step S204 that the obtained position information and the read-out position information are coincident with each other (S204: YES), the radio communication device 1 returns to the step S201 to repeat the subsequent processing under the control of the controller 10.

When it is determined in step S204 that the obtained position information and the read-out position information are not coincident with each other (S204: NO), through the processing of the position information managing unit 103 based on the control of the controller 10, the radio communication device 1 updates the position information recorded in the present position information recording unit 110 to the position information obtained in step S202 (S205).

Through the processing of the position information managing unit 103 based on the control of the controller 10, the radio communication device 1 communicates with the base station BS of the wide-area radio network, and registers the obtained position information as the position information representing the present position into a managing device (not shown) connected to the wide-area radio network (S206).

Then, the radio communication device 1 returns to the step S201 to repeat the subsequent processing under the control of the controller 10.

When it is determined in step S201 that the stop instruction is accepted (S201: YES), the radio communication device 1 stops the processing associated with the first communication unit 12 under the control of the controller 10.

Figure 9A:
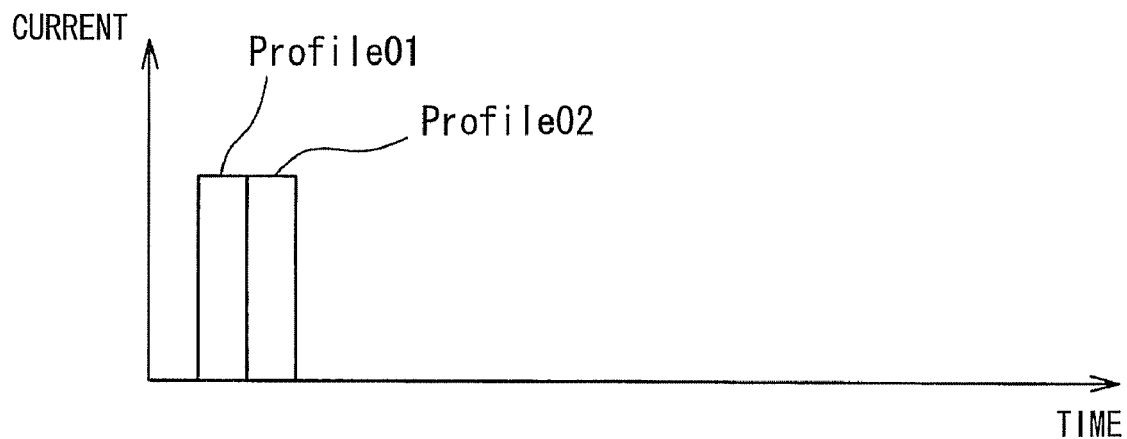
FIGS. 9A and 9B illustrate time charts of a time variation of current associated with the scan operation of the radio communication device according to the first embodiment.
Figure 9B:
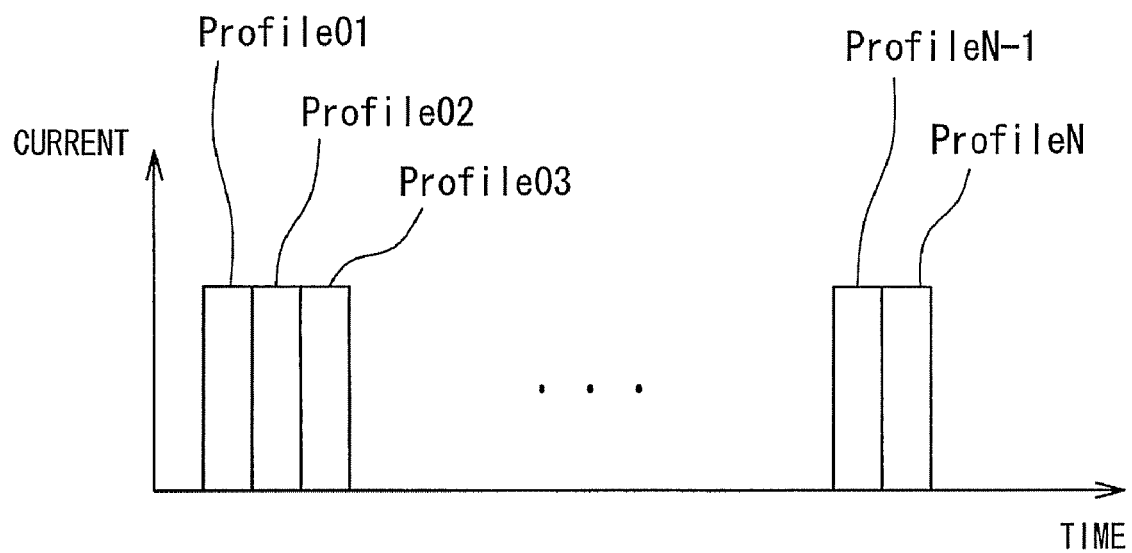

FIGS. 9A and 9B are time charts of the time-variation of current associated with the scanning operation of the radio communication device 1. FIG. 9A is the time variation of current associated with the scanning operation of the local-area radio communication network that is executed when the radio communication device 1 secedes from the communication range of the local-area radio network. FIG. 9B is a time chart of the time variation of current associated with the scan operation of a conventional device.

The radio communication device 1 illustrated in FIG. 9A executes only the scanning operation associated with the communication set information recorded in association with the position information. In the example illustrated in FIG. 9A, only the scanning operation associated with the communication set information of "Profile01" and "Profile02" is executed. On the other hand, the conventional device illustrated in FIG. 9B executes the scanning operation associated with all the recorded communication set information. In the example illustrated in FIG. 9B, the scanning operation associated with the communication set information from "Profile01" to "ProfileN". As is apparent from the comparison between FIGS. 9A and 9B, the radio communication device 1 according to the present invention has an excellent effect that it can reduce the power consumption required for the scanning operation, etc. That is, by the construction of FIG. 3 and the processing described with reference to the flowchart of FIG. 6 to 8, much time is taken for the scanning operation and power is needlessly consumed in one scanning operation of the local-area radio network in the prior art as illustrated in FIG. 9B if there is communication set information associated with local-area radio networks of N. However, when there are two communication set information associated with the narrow radio network associated with the base station BS of the wide-area radio network, the scanning processing require little time as illustrated FIG. 9A, and the power consumption required for the scanning operation can be expected to be reduced.

Second Embodiment

According to a second embodiment, channel information representing a communication channel to be used is recorded in association with the communication set information, and the scanning operation is executed on the basis of the communication channel indicated by the recorded channel information in the first embodiment. The same constructions as the first embodiment are represented by the same reference numerals as the first embodiment, and the detailed description thereof is omitted because the first embodiment may be referred to. The general outline, the hardware construction and the functional construction of the radio communication device 1 and the functional construction of the second embodiment are the same as the first embodiment, and thus the description thereof is omitted because the first embodiment may be referred to.

FIG. 10 is a diagram of the recording content of the communication table 14 of the radio communication device 1 according to the second embodiment. Communication set information and channel information representing communication channels usable in the communication based on the communication set information concerned are recorded in association with position information in the communication table 114. For example, during the communication based on the communication set information represented by "Profile01", only a channel 1 (ch1), a channel 6 (ch6), a channel 11 (ch11) and a channel 14 (ch14) out of settable channels 1 to 14 are used. Furthermore, during the communication based on the communication set information represented by "Profile02", only the channel 1 (ch1) and the channel 6 (ch6) out of the settable channels 1 to 14 are used.

Figure 11:
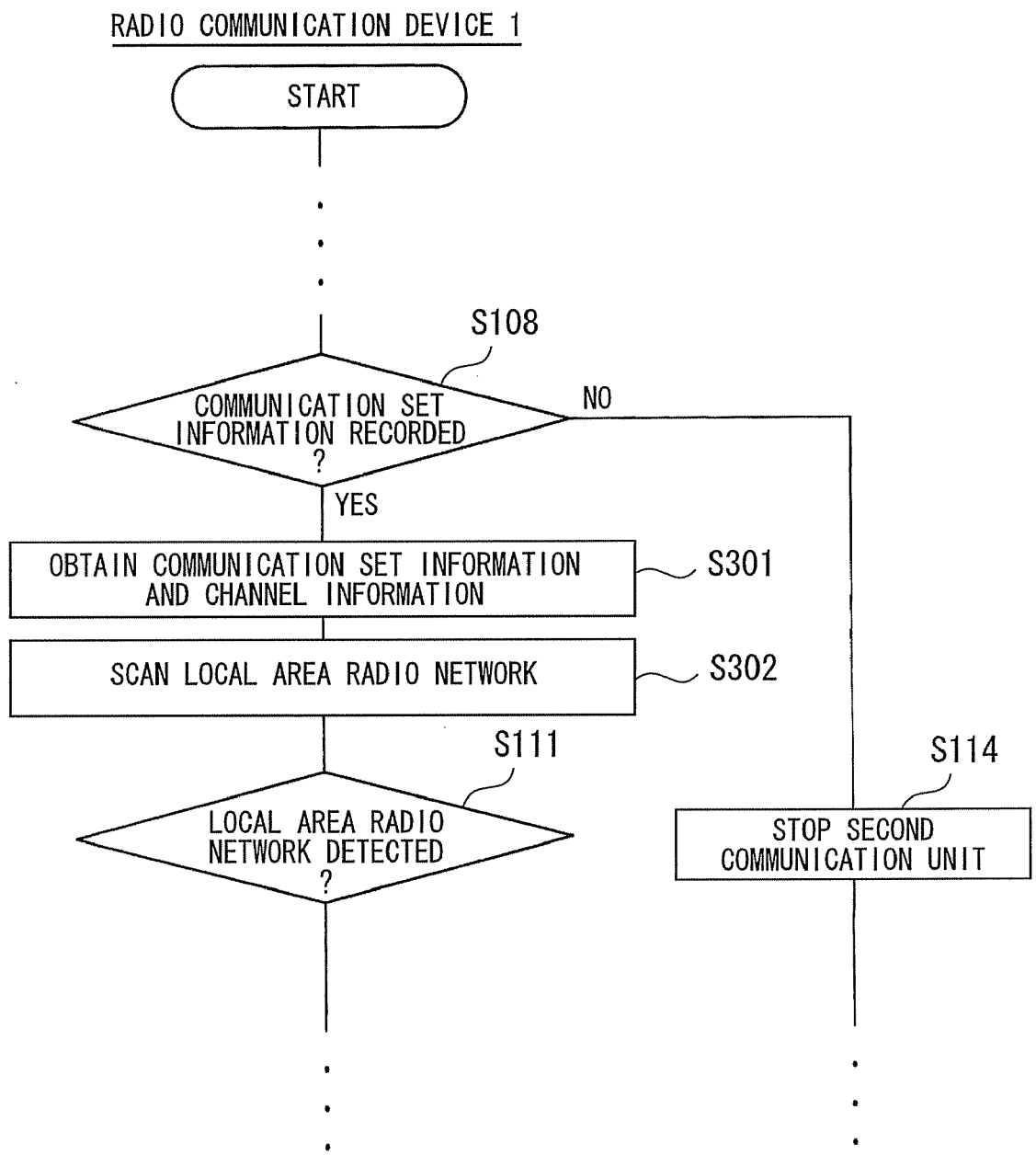
FIG. 11 illustrates a flowchart of the processing associated with a second communication unit of the radio communication device according to the second embodiment.

Next, the processing associated with the second communication unit 13 of the radio communication device 1 according to the second embodiment of the present invention will be described. FIG. 11 is a flowchart of the processing associated with the second communication unit of the radio communication device 1 according to the second embodiment of the present invention. The processing of the radio communication device 1 according to the second embodiment is different from the processing associated with the first embodiment described with reference to FIGS. 6 an 7 in the processing of the step S107 and subsequent steps. The radio communication device 1 executes the processing of the steps S101 to S108 of the processing associated with the first embodiment described with reference to FIGS. 6 and 7.

The radio communication device 1 obtains the communication set information (scan profile) and the channel information as a scan target through the processing of the communication set reading unit 103 based on the control of the controller 10 for executing the radio communication program PRG recorded in the recording unit 11 (S301). In step S301, the processing of obtaining the content of the communication set information recorded in the scan communication set information recording unit 113 from the communication set information recording unit 111 is executed. In step S301, the channel information corresponding to the communication set information recorded in the scan communication set information recording unit 113, that is, the channel information corresponding to the obtained position information is obtained from the communication table 114.

Through the processing of the scanning unit 105 based on the control of the controller 10, the radio communication device 1 executes the scanning operation for detecting a connectable local-area radio network on the basis of the communication set information and the channel information obtained in step S301 (S302). In step S302, the radio communication device 1 carries out the scanning operation based on the communication set information recorded in the scan communication set information recording unit 113. However, the communication channel used in the scanning operation is only the communication channel represented by the obtained channel information.

The radio communication device 1 executes the processing of the step S111 and subsequent steps of the processing associated with the first embodiment described with reference to FIGS. 6 and 7. In step S108, when it is determined that no communication set information is recorded (S108: NO), the processing of the step S114 and subsequent steps of the processing according to the first embodiment described with reference to FIGS. 6 and 7 is executed.

The processing associated with the first communication unit 12 of the radio communication device 1 according to the second embodiment is the same as the first embodiment, and the description thereof is omitted because the first embodiment may be referred to.

In the second embodiment, only the communication channel represented by the channel information recorded in association with the communication set information is scanned. Therefore, the communication cost can be more greatly reduced as compared with the first embodiment. When the scanning operation is executed every communication set information (profile information) of the first embodiment, 4-channel scanning is carried out in Auto (1, 6, 11, 14) setting. On the other hand, in the second embodiment, the scanning is carried out every channel. Accordingly, for example when only one channel out of Auto 4 channels is used, the scanning time is reduced to ¼, and it is expected that the power consumption required for the scanning operation can be reduced.

Third Embodiment

According to a third Embodiment, when the communication range of the local-area radio network straddles communication ranges of plural wide-area radio networks, the recording content of the communication table is automatically updated. The same constituent elements as the first embodiment are represented by the same reference numerals, and the detailed description thereof is omitted because the first embodiment may be referred to. The brief summary, hardware construction and functional construction of the radio communication device 1 according to the third embodiment are the same as the first embodiment, and the description thereof is omitted because the first embodiment may be referred to.

The processing of the radio communication device 1 according to the third embodiment of the present invention will be described.

Figure 12:
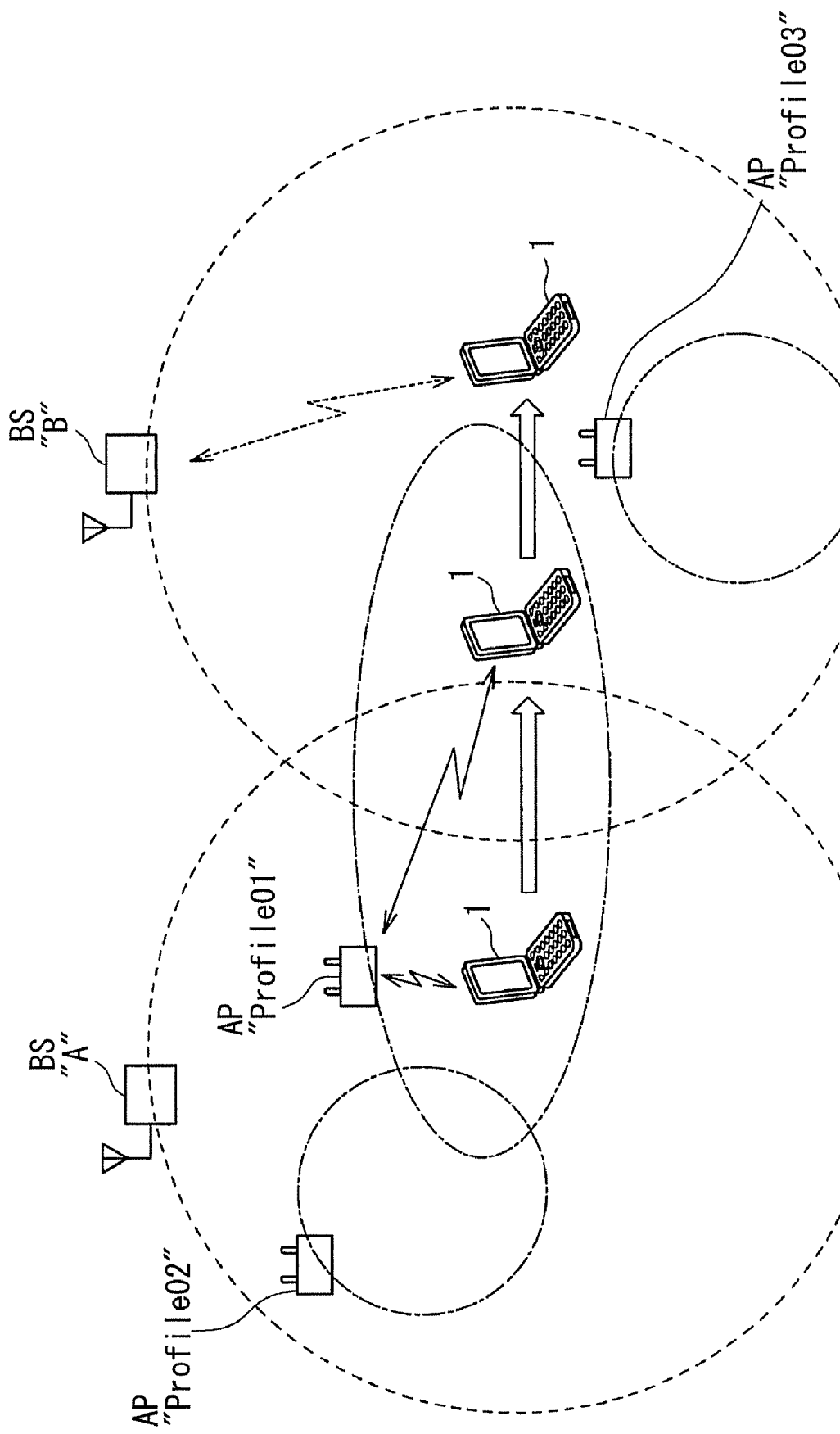
FIG. 12 illustrates an explanatory diagram of a condition under which the communication processing of a radio communication device according to a third embodiment is executed.

FIG. 12 is a diagram of the condition that the communication processing of the radio communication device 1 according to the third embodiment is executed. In FIG. 12, circles indicated by broken lines represent communication ranges of base stations BS constituting a wide-area radio network, and the position information on each of the base stations BS constituting the communication ranges is represented by "A", "B". Circles indicated by one-dotted chain lines in FIG. 12 represent communication ranges of fixed stations AP constituting local-area radio networks. The communication set information of the fixed stations AP constituting the communication ranges is represented by "Profile01", "Profile02" and "Profile03". The processing of the radio communication device 1 according to the third embodiment of the present invention described later means the processing executed under a condition that the radio communication device 1 connected to the local-area radio network having the communication set information "Profile01" in the communication range of the base station BS having the position information "A" is moved into the communication range of the base station BS having the position information "B", and secedes from the communication range of the local-area radio network.

Figure 13:
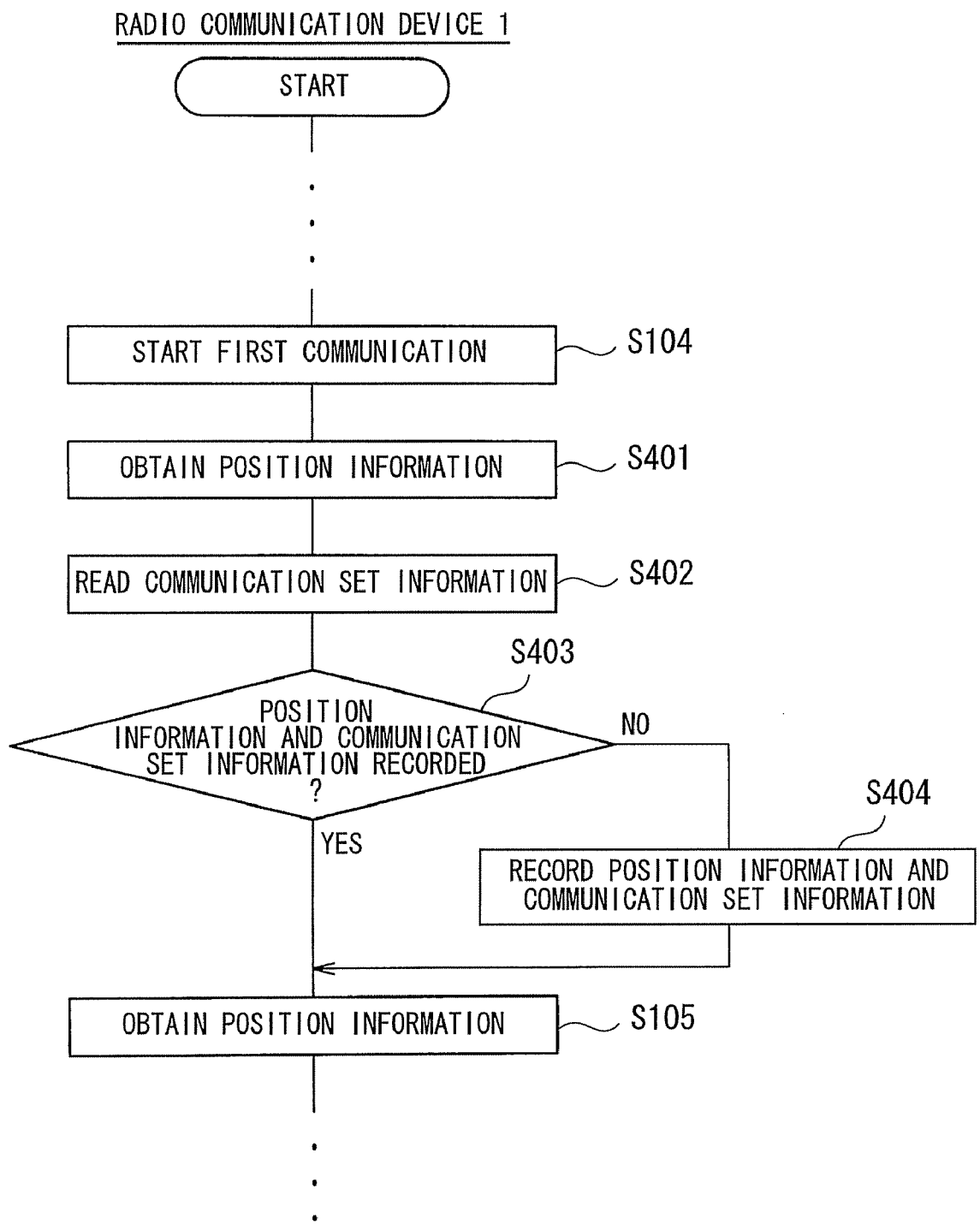
FIG. 13 illustrates a flowchart of the processing associated with a second communication unit of a radio communication device according to a third embodiment.

FIG. 13 is a flowchart of the processing associated with the second communication unit 13 of the radio communication device 1 according to the third embodiment of the present invention. The radio communication device 1 executes the processing of the steps S101 to S104 of the processing associated with the first embodiment described with reference to FIGS. 6 and 7.

The radio communication device 1 obtains the position information representing the present position from the base station BS of the connectable wide-area radio communication network through the processing of the position information obtaining unit 102 under the control of the controller 10 for executing the radio communication program PRG recorded in the recording unit 11 (S401). In the example of FIG. 12, the radio communication device 1 obtains the position information "B" when it is located at a position just after it secedes from the communication range of the fixed station AP represented by "Profile01" in the example of FIG. 12.

Through the processing of the communication set reading unit 103 based on the control of the controller 10, the radio communication device 1 reads the communication set information recorded in the communication set information setting unit 112 (S402). The communication set information read in step S402 is the communication set information associated with the fixed station AP constituting the local-area radio network to which the radio communication device 1 cannot be connected because it secedes from the communication range, and it is the communication set information represented by "Profile01" in the example illustrated in FIG. 12.

Through the processing of the communication setting and reading unit 104 based on the control of the controller 10, the communication radio device 1 determines whether the obtained position information and the read-out communication set information are recorded in association with each other in the recording unit 11 (S403). In step S403, it is determined whether the record associating the obtained position information with the read-out communication set information is recorded in the communication table 114 of the recording unit 11.

If it is determined in step S403 that the position information and the communication set information are not recorded in association with each other (S403: NO), the radio communication device 1 records the position information and the communication set information in association with each other in the recording unit 11 (S404) under the control of the controller 10. In step S404, the update processing of additionally recording the obtained position information and the read-out communication set information as an associated record into the communication table 114 of the recording unit 11 is executed.

The radio communication device 1 executes the processing of the step 105 and subsequent steps of the processing according to the first embodiment described with reference to FIGS. 6 and 7.

It is determined in step S403 when the position information and the communication set information are recorded in association with FIGS. 6 and 7 (S403: YES), the radio communication device 1 executes the processing of the step S105 and subsequent steps of the processing according to the first embodiment described with reference to FIGS. 6 and 7.

The processing associated with the first communication unit 12 of the radio communication device 1 according to the third embodiment is the same processing as the first embodiment, and the description thereof is omitted because the first embodiment may be referred to.

FIG. 14 is a diagram of the recording content of the communication table 114 of the radio communication device 1 according to the third embodiment of the present invention. FIGS. 14A and 14B are the recording content of the communication table 114 concerning the condition illustrated in FIG. 12. FIG. 14A is the recording content of the communication table 114 at the determination time of the step S403. As illustrated in FIG. 12, the radio communication device 1 is set to a state just after it secedes from the communication range of the fixed station AP indicated by "Profile01", and obtains the position information "B" from the base station BS. Under this state, the communication set information read from the communication set information setting unit 112 of the radio communication device 1 is "Profile01". However, the recording content of the communication table 114 illustrated in FIG. 14A does not contain any record in which the position information "B" and the communication set information "Profile01" are recorded in association with each other. Therefore, as the processing of step S404, the obtained position information "B" and the read-out communication set information "Profile01" are additionally recorded as an associated record into the communication table 114 of the recording unit 11. FIG. 14B is the recording content of the communication table 114 after the communication table 114 is updated. As illustrated in FIG. 14B, a record in which the position information "B" and the communication set information "Profile01" are associated with each other is newly recorded.

In the third embodiment, the communication table 114 is automatically updated on the basis of the position information and the communication set information. However, the present invention is not limited to this style. For example, the processing of requesting the user to check or correct the update of the recording content of the communication table 114 may be added, and a part of the update processing may be manually performed.

Fourth Embodiment

According to a fourth embodiment, when a connectable local-area radio network cannot be detected by only one scanning operation based on the communication set information in the first embodiment, the interval of the re-scanning operation to be repetitively executed is adjusted. The same constituent elements as the first embodiment are represented by the same reference numerals as the first embodiment, and the detailed description thereof is omitted because the first embodiment may be referred to. The brief summary, hardware construction and functional construction of the radio communication device 1 according to the fourth embodiment are the same as the first embodiment, and the description thereof is omitted because the first embodiment may be referred to.

Figure 15:
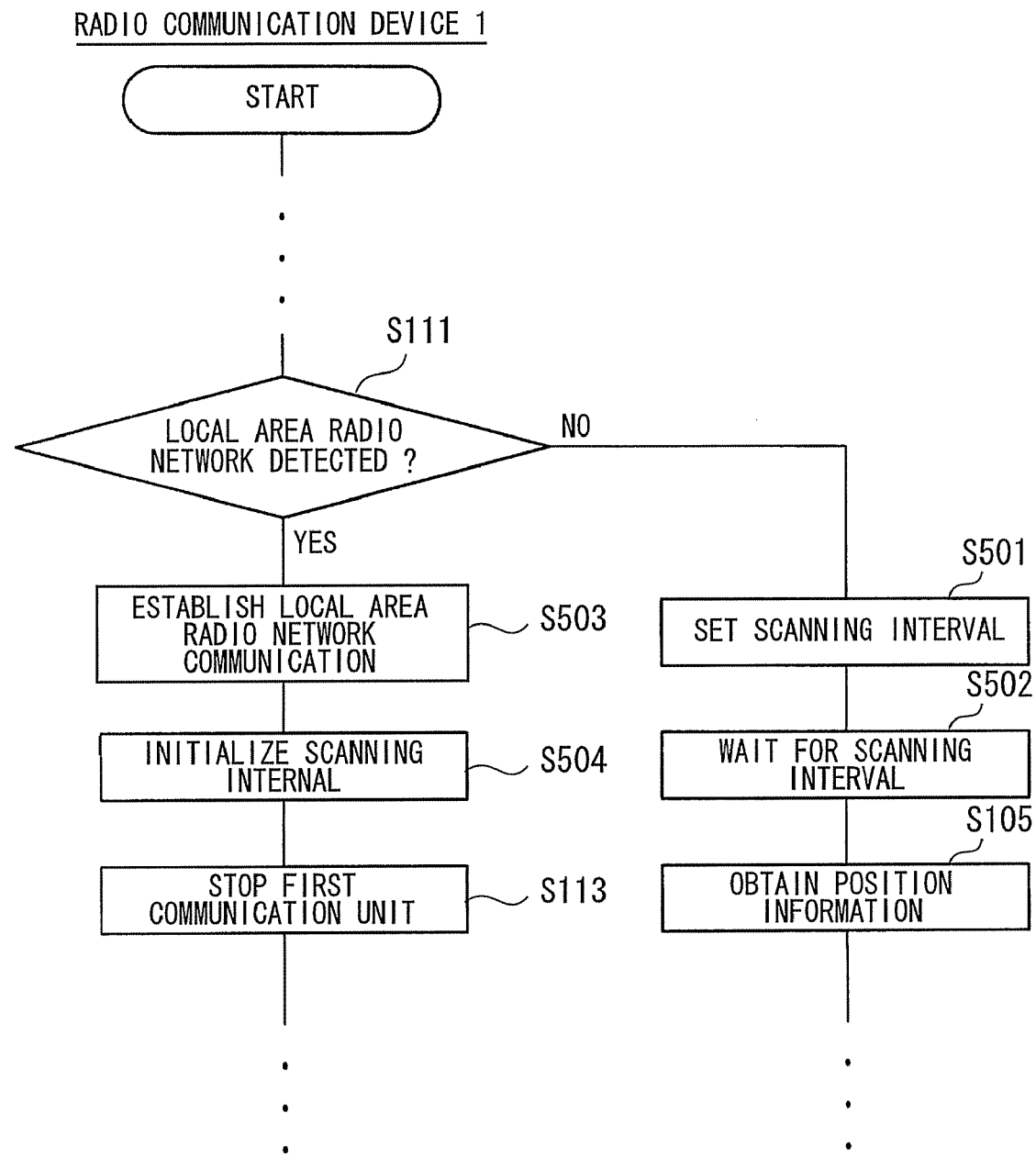
FIG. 15 illustrates a flowchart of the processing associated with a second communication unit of a radio communication device according to a fourth embodiment.

Next, the processing of the radio communication device 1 according to the fourth embodiment will be described. FIG. 15 is a flowchart of the processing associated with the second communication unit of the radio communication device 1 according to the fourth embodiment. The radio communication device 1 executes the processing of steps S101 to S111 of the processing according to the first embodiment described with reference to FIGS. 6 and 7.

Through the processing of the scanning unit 105 based on the control of the controller 10 for executing the radio communication program PRG recorded in the recording unit 11, the radio communication device 1 determines on the basis of the scanning operation based on the communication set information whether a connectable local-area radio network can be detected (S111).

When no connectable local-area radio network can be detected in step S111 (S111: NO), the radio communication device 1 sets the scanning interval on the basis of a preset reference under the control of the controller 10 (S501). The scanning interval set in step S501 means a standby time when the scanning operation on the local-area radio network is intermittently executed. The method of setting the scanning interval will be described later.

The radio communication device 1 is on standby for the time corresponding to the set scanning interval (S502), and returns to the step S105 of the processing associated with the first embodiment described with reference to FIGS. 6 and 7 to execute the subsequent processing. The processing of the step S109 and subsequent steps may be repeated.

The scanning interval set in step S501 will be described.

The maximum interval as the upper limit of the standby time and an initial interval as the minimum interval corresponding to the lower limit of the standby time are set as the scanning interval. In step S501, the shortest initial interval is set after the first scanning operation is executed. The scanning interval is set to be stepwise longer every time the scanning operation is repeated. When the scanning interval reaches the maximum interval, the maximum interval concerned is subsequently set as the scanning interval. For example, the previous scanning interval is updated to be added with a predetermined interval every time the processing of the step S501 is executed, whereby it is possible to execute the processing of stepwise lengthening the scanning interval. That is, it is expectable to reduce the power consumption, etc. by thickening the scanning interval at the initial stage and then stepwise roughening the scanning interval because the response in the case of re-connection just after the radio communication device secedes from the local-area radio network becomes high and also the scanning interval is lengthened when the radio communication device is continued to be outside the communication range for a long time.

Another method of the scanning interval set in step S501 will be described.

After the connection to the local-area radio network becomes impossible, the position information representing the present position obtained by the position information obtaining unit 102 is changed, and also the maximum interval is set as the scanning interval when the communication set information corresponding to the position information after the change is recorded in the communication set information recording unit 111. That is, when the base station BS of the wide-area radio network is changed due to the movement of the radio communication device 1 after the outside-range scanning is started, or when the second communication unit 13 is temporarily stopped and then the scanning operation is started again, the scanning interval is set to the maximum scanning interval, whereby the thickened scanning operation just after the scan is started is extinguished and thus needless power consumption can be suppressed. In general, the communication range of the local-area radio communication network is extremely narrow as compared with the communication range of the wide-area radio network, and thus it is hardly considered that the radio communication device enters the communication range of the local-area radio communication just after the base station information of the wide-area radio network is changed. Therefore, it is expected that the above scanning method can sufficiently meet the requirement.

When a connectable local-area radio network can be detected in step S111 (S111: YES), the radio communication device 1 establishes the communication with the fixed station AP associated with the detected local-area radio network under the control of the controller 10 (S503).

The radio communication device 1 executes initialization of returning the set scanning interval to the initial interval (S504).

The radio communication device 1 executes the processing of the step S113 and subsequent steps of the processing according to the first embodiment described with reference to FIGS. 6 and 7.

The processing associated with the first communication unit 12 of the radio communication device 1 according to the fourth embodiment is the same as the first embodiment, and the description thereof is omitted because the first embodiment may be referred to.

In the fourth embodiment, the communication cost can be reduced by dynamically changing the scanning interval.

Fifth Embodiment

According to a fifth embodiment, a scan target is stepwise changed in the first embodiment. The same constituent elements as the first embodiment are represented by the same reference numerals, and the detailed description thereof is omitted because the first embodiment may be referred to. The brief summary, hardware construction and functional construction of the radio communication device 1 according to the fifth embodiment are the same as the first embodiment, and the description thereof is omitted because the first embodiment may be referred to.

Figure 16:
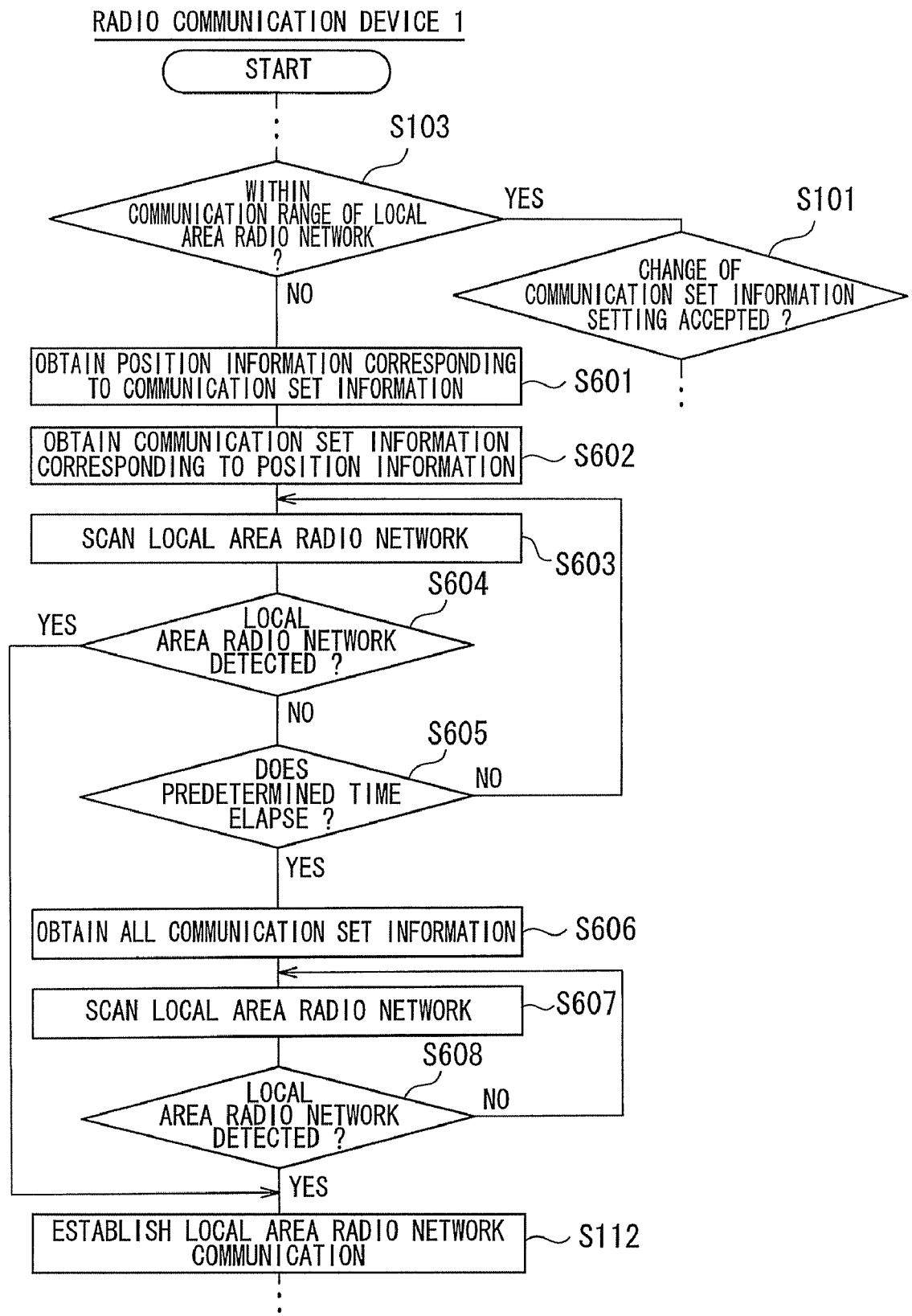
FIG. 16 illustrates a flowchart of the processing associated with a second communication unit of a radio communication device according to a fifth embodiment.

Next, the processing of the radio communication device 1 according to the fifth embodiment of the present invention will be described. FIG. 16 is a flowchart of the processing associated with the second communication unit 13 of the radio communication device 1 according to the fifth embodiment of the present invention. The radio communication device 1 executes the processing of the steps S101 to S103 of the processing according to the first embodiment described with reference to FIGS. 6 and 7.

The radio communication device 1 determines whether it is located within the communication range of the local-area radio network associated with the fixed station AP to be connected on the basis of the set communication set information (S103). When it is determined that the radio communication device 1 is within the communication range (S103: YES), it returns to the step S101 to repeat the subsequent processing.

When it is determined in step S103 that the radio communication device 1 is outside the communication range (S103: NO), through the processing of the position information obtaining unit 102 based on the control of the controller 10 for executing the radio communication program PRG recorded in the recording unit 11, the radio communication device 1 obtains the position information that is recorded in association with the communication set information associated with the connected local-area radio network in the recording unit 11 (S601). The communication set information associated with the connected local-area radio network means the communication set information recorded in the communication set information setting unit 112, that is, the communication set information associated with the local-area radio network to which the radio communication device 1 has been connected until just before. In step S601, the recording content of the communication table 114 of the recording unit 11 is searched, and the position information corresponding to the communication set information is obtained.

Through the processing of the communication setting and reading unit 104 based on the control of the controller 10, the radio communication device 1 obtains the communication set information that is recorded in association with the obtained position information in the recording unit 11 (S602). In step S602, the communication set information corresponding to the obtained position information is first read out by referring to the communication table 114. The read-out communication set information is recorded (set) as communication set information (scan profile) as a scanning target when the radio communication device 1 is outside the communication range of the local-area radio network into the scanning communication set information recording unit 113. Subsequently, in step S602, the content of the communication set information recorded in the scan communication set information recording unit 113 is obtained from the communication set information recording unit 111.

Through the processing of the scanning unit 105 based on the control of the controller 10, the radio communication device 1 executes the scanning operation to detect a connectable local-area radio network on the basis of the communication set information obtained in step S602 (S603), and it is determined whether a connectable local-area radio network can be detected (S604).

When it is determined in step S604 that a connectable local-area radio network can be detected (S604: YES), the radio communication device 1 executes the processing of the step S112 and subsequent steps of the processing associated with the first embodiment described with reference to FIGS. 6 and 7.

When no connectable local-area radio network is detected in step S604 (S604: NO), under the control of the controller 10, the radio communication device 1 determines whether a preset predetermined time elapses or not from the start of the scanning of the step S603 (S605).

When it is determined in step S605 that the predetermined time does not elapse (S605: NO), the radio communication device 1 returns to the step S603 under the control of the controller 10, and repeats the scanning until the time reaches the predetermined time.

When it is determined in step S605 whether the predetermined time elapses (S605: YES), the radio communication device 1 obtains all the communication set information recorded in the communication set information recording unit 111 of the recoding unit 11 through the processing of the communication set reading unit 103 based on the control of the controller 10 (S606). In step S606, the communication set information is recorded into the scanning communication set information recording unit 113 of the recording unit 11 as communication set information as a scan target when the radio communication device is outside the communication range of the local-area radio network.

Through the processing of the scanning unit 105 based on the control of the controller 10, the radio communication device 1 executes the scanning operation to detect a connectable local-area radio network on the basis of the communication set information obtained in step S606 (S607), and determines whether a connectable local-area radio network can be detected (S608). In step S607, the radio communication device 1 executes the scanning operation based on the communication set information recorded in the scanning communication set information recording unit 113, that is, all the communication set information.

When a connectable local-area radio network can be detected in step S608 (S608: YES), the radio communication device 1 executes the processing of the step S112 and subsequent steps of the processing according to the first embodiment described with reference to FIGS. 6 and 7.

When no connectable local-area radio network can be detected in step S608 (S608: NO), the radio communication device 1 returns to the step S607 and repeats the subsequent processing under the control of the controller 10. When the repetition frequency reaches a preset predetermined frequency, the second communication unit 13 may be stopped and then the processing may be finished.

The processing associated with the first communication unit 12 of the radio communication device 1 according to the fifth embodiment is the same as the first embodiment, and the description thereof is omitted because the first embodiment may be referred to.

Sixth Embodiment

According to a sixth embodiment, a scan target is stepwise changed in the first embodiment, and it is different from the fifth embodiment. The same constituent elements as the first embodiment are represented by the same reference numerals, and the detailed description thereof is omitted because the first embodiment may be referred to. The brief summary, hardware construction and functional construction of the sixth embodiment are the same as the first embodiment, and the description thereof is omitted because the first embodiment 1 may be referred to.

Figure 17:
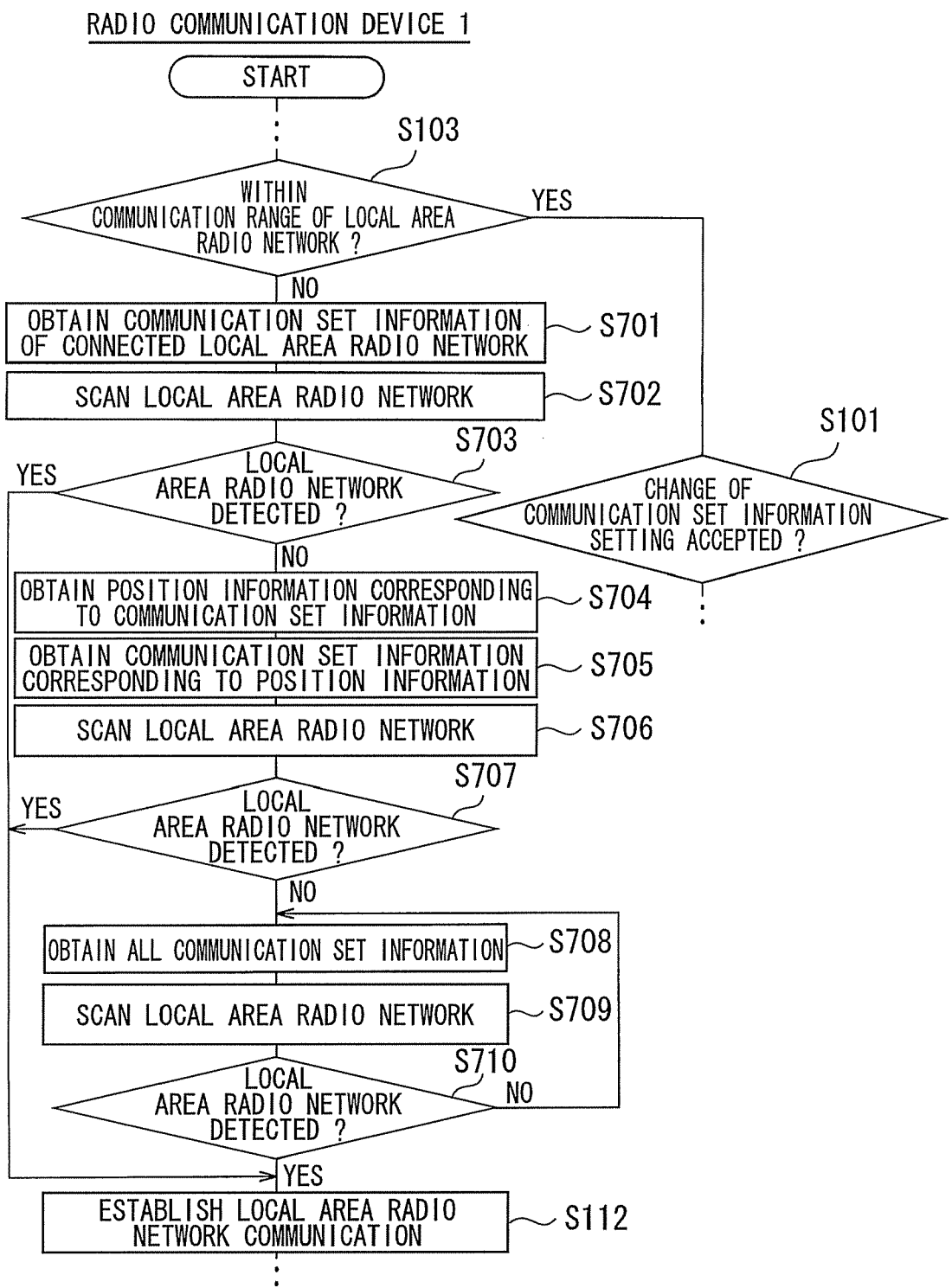
FIG. 17 illustrates a flowchart of the processing associated with a second communication unit of a radio communication device according to a sixth embodiment.

Next, the processing of the radio communication device 1 according to the sixth embodiment will be described. FIG. 17 is a flowchart of the processing associated with the second communication unit 13 of the radio communication device 1 according to the sixth embodiment of the present invention. The radio communication device 1 executes the processing of the steps S101 to S103 of the processing according to the first embodiment described with reference to FIGS. 6 and 7.

The radio communication device 1 determines whether it is within the communication range of the local-area radio network associated with the connected fixed station AP on the basis of the set communication set information (S103). When it is determined that the radio communication device 1 is within the communication range (S103: YES), it returns to the step S101 to repeat the subsequent processing.

When it is determined in step S103 that the radio communication device 1 is outside the communication range (S103: NO), the radio communication device 1 obtains the communication set information associated with the connected local-area radio network from the recording unit 11 under the control of the controller 10 for executing the radio communication program PRG recorded in the recoding unit 11 (S701). The communication set information obtained in step S701 is the communication set information recorded in the communication set information setting unit 112 of the recording unit 11, and it is the communication set information associated with the local-area radio network to which the radio communication device 1 has been connected until just before. In step S701, the communication set information is recorded into the scanning communication set information recording unit 113 of the recording unit 11 as communication set information as a scan target when the radio communication device 1 is outside the communication range of the local-area radio network.

Through the processing of the scanning unit 105 based on the control of the controller 10, the radio communication device 1 executes the scanning operation to detect a connectable local-area radio network on the basis of the obtained communication set information (S702), and determines whether a connectable local-area radio network can be detected (S703). In step S702, the radio communication device 1 executes the scanning operation to re-connect to the local-area radio network to which the radio communication device 1 has been connected until just before.

When it is determined in step S703 when a connectable local-area radio network can be detected (S703: YES), the radio communication device 1 executes the processing of the step S112 and subsequent steps of the processing according to the first embodiment described with reference to FIGS. 6 and 7.

When no connectable local-area radio network can be detected in step S703 (S703: NO), the radio communication device 1 obtains the position information recorded in association with the communication set information of the connected local-area radio network in the recording unit 11 through the processing of the position information obtaining unit 102 based on the control of the controller 10 (S704). The communication set information of the connected local-area radio network means the communication set information to which the radio communication device 1 has been connected until just before. In step S704, the recording content of the communication table 114 of the recording unit 11 is searched to obtain the position information corresponding to the communication set information.

Through the processing of the communication set reading unit 103 based on the control of the controller 10, the radio communication device 1 obtains the communication set information recorded in association with the obtained position information in the recording unit 11 (S705). In step S705, the communication set information corresponding to the obtained position information is read out by referring to the communication table 114. The read-out communication set information is recorded (set) into the scanning communication set information recording unit 113 of the recording unit 11 as communication set information (scan profile) as a scan target when the radio communication device 1 is outside the communication range of the local-area radio network. Subsequently, in step S705, the content of the communication set information recorded in the scanning communication set information recording unit 113 is obtained from the communication set information recording unit 111.

Through the processing of the scanning unit 105 based on the control of the controller 10, the radio communication device 1 executes the scanning operation to detect a connectable local-area radio network on the basis of the communication set information obtained in step S705 (S706), and determined whether a connectable local-area radio network can be detected or not (S707).

When it is determined in step S707 that a connectable local-area radio network can be detected (S707: YES), the radio communication device 1 executes the processing of the step S112 and subsequent steps of the processing according to the first embodiment described with reference to FIGS. 6 and 7.

When no connectable local-area radio network can be detected in step S707 (S707: NO), the radio communication device 1 obtains all the communication set information recorded in the communication set information recording unit 111 of the recording unit 11 through the processing of the communication set reading unit 103 based on the control of the controller 10 (S708). In step S708, the communication set information is recorded into the scanning communication set information recording unit 113 of the recording unit 11 as communication set information as a scan target when the radio communication device 1 is outside the communication range of the local-area radio network.

Through the processing of the scanning unit 105 based on the control of the controller 10, the radio communication device 1 executes the scanning operation to detect a connectable local-area radio network on the basis of the communication set information obtained in the step S708 (S709), and determines whether a connectable local-area radio network can be detected or not (S710). In step S709, the radio communication device 1 executes the scanning operation based on the communication set information recorded in the scanning communication set information recording unit 113, that is, all the communication set information.

When it is determined in step S710 that a connectable local-area radio network can be detected (S710: YES), the radio communication device 1 executes the processing of the step S112 and subsequent steps of the processing according to the first embodiment described with reference to FIGS. 6 and 7.

When no connectable local-area radio network can be detected in step S710 (S710: NO), the radio communication device 1 returns to the step S708 and repeats the subsequent processing under the control of the controller 10. When the repetition frequency reaches a preset predetermined frequency, the second communication unit 13 may be stopped and the processing may be finished.

The processing associated with the first communication unit 12 of the radio communication device 1 according to the sixth embodiment is the same as the first embodiment, and the description thereof is omitted because the first embodiment may be referred to.

According to the construction as described above, the scanning of the local-area radio communication network is executed in the probability order of re-connection, and thus needless scanning is suppressed, so that it is expectable to reduce the power consumption, etc.

Seventh Embodiment

The radio communication devices 1 in the first to sixth embodiments, after determining the communication with the local-area radio network is in difficult state, obtain the communication set information associated with the position information.

The radio communication device 1 in the seventh embodiment, before determining the communication with the local-area radio network is in difficult state, obtains the communication set information (and channel information) associated with the position information.

In other words, with the second communication unit 13 communicating with the local-area radio network with which the radio communication device 1 has established the communication, the radio communication device 1 in the seventh embodiment obtains the position information (and the channel information), and obtains the communication set information associated with the obtained position information.

Furthermore, the radio communication device 1 in the seventh embodiment, after determining the communication with the local-area radio network is in difficult state, executes the scanning operation on the basis of the obtained communication set information (and channel information).

In the seventh embodiment, the same constructions as the first embodiment are represented by the same reference numerals as the first embodiment, and the detailed description thereof is omitted because of the first embodiment may be referred to.

The general outline, the hardware construction and the functional construction of the radio communication device 1 and the functional construction of the seventh embodiment are the same as the first embodiment, and thus the description thereof is omitted because the first embodiment may be referred to.

Figure 18:
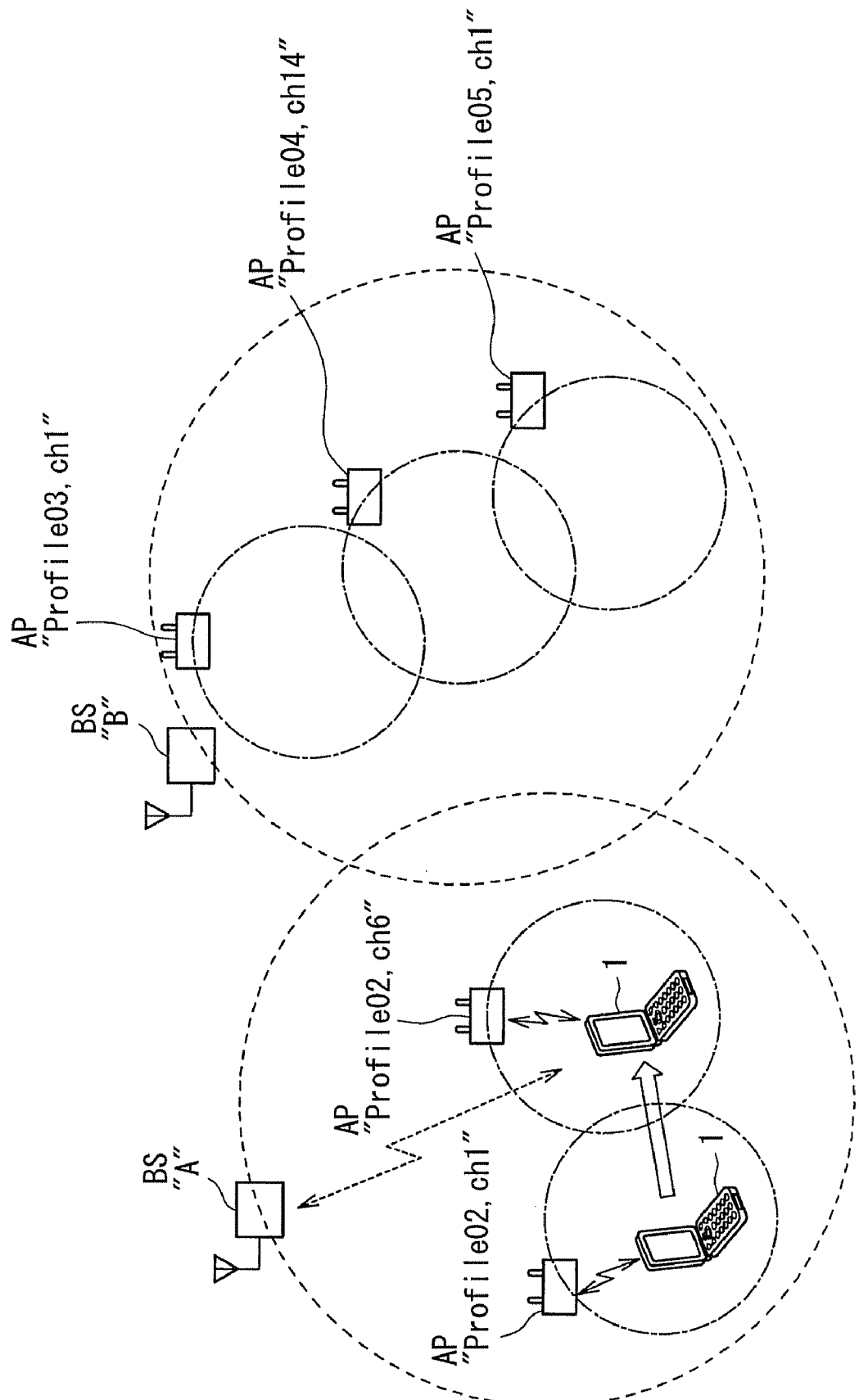
FIG. 18 illustrates an explanatory diagram of a condition under which the communication processing of the radio communication device according to the seventh embodiment is executed.

FIG. 18 illustrates a diagram of the condition under which the communication processing of the radio communication device 1 according to the seventh embodiment is executed.

In FIG. 18, circles indicated by broken lines represent communication ranges of the base stations BS constituting the wide-area radio network, and the symbols of "A", "B", etc. represent the position information associated with the base stations BS.

Furthermore, in FIG. 18, circles indicated by one-dotted chain lines represent communication ranges of the fixed stations AP constituting the local-area radio network, and the symbols of "Profile02, ch1", "Profile02, ch6", etc. represent communication ranges of the fixed stations AP.

The processing of the radio communication device 1 according to the seventh embodiment that will be described below is executed under the condition, for example, that the radio communication device 1 moves from the communication range of the fixed station AP indicated by "Profile02, ch1" to the communication range of the fixed station AP indicated by "Profile02, ch6" illustrated in FIG. 18.

The processing of the radio communication device 1 according to the seventh embodiment that will be described below is executed under the condition, for example, that the radio communication device 1 moves from the communication range of the fixed station AP indicated by "Profile03, ch1" to the communication range of the fixed station AP indicated by "Profile04, ch14" illustrated in FIG. 18.

The processing of the radio communication device 1 according to the seventh embodiment that will be described below is executed under the condition, for example, that the radio communication device 1 moves from the communication range of the fixed station AP indicated by "Profile02, ch6" to the communication range of the fixed station AP indicated by "Profile04, ch14" illustrated in FIG. 18.

Figure 19:
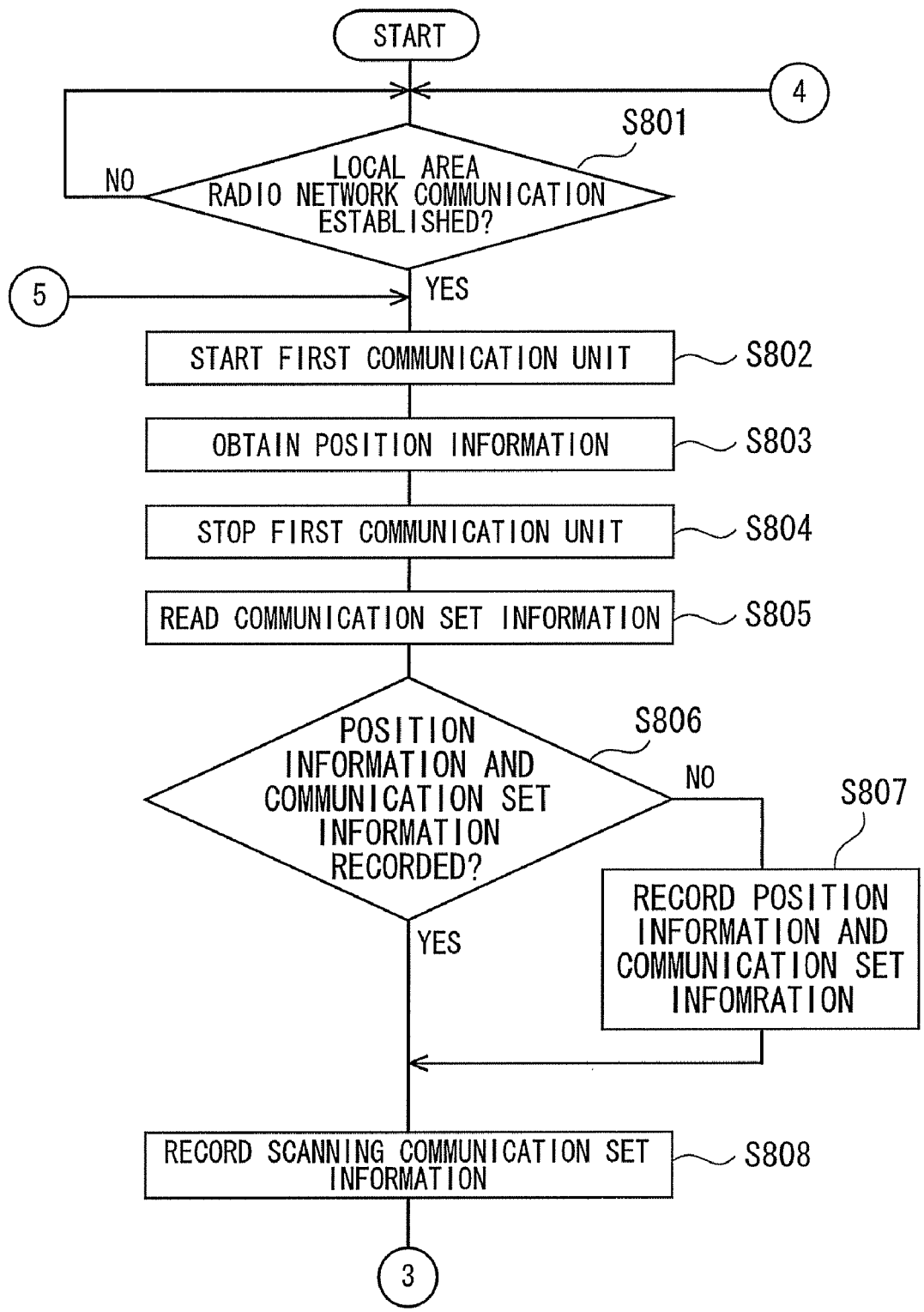
FIG. 19 illustrate a flowchart of the processing associated with the second communication unit 13 of the radio communication device 1 according to the seventh embodiment of the present invention.
Figure 20:
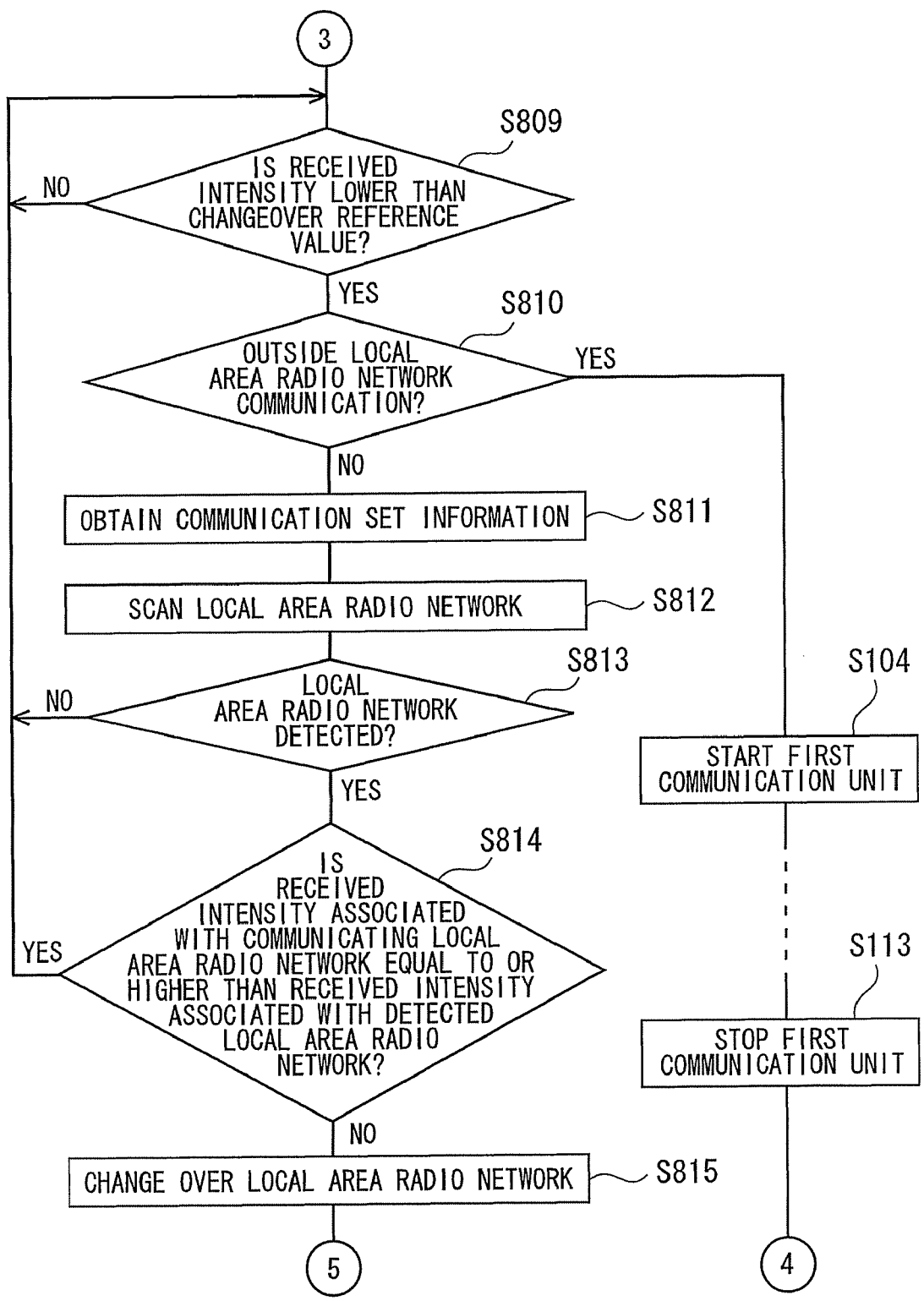
FIG. 20 illustrate a flowchart of the processing associated with the second communication unit 13 of the radio communication device 1 according to the seventh embodiment of the present invention.

FIG. 19 and FIG. 20 illustrate a flowchart of the processing associated with the second communication unit 13 of the radio communication device 1 according to the seventh embodiment of the present invention.

Through the processing of the communication setting and reading unit 101 based on the control of the controller 10, the radio communication device 1 determines whether the device 1 has established the communication with the fixed AP associated with the detected local-area radio network through the second communication unit 13 (S801).

In the step S801, the radio communication device 1 activates the second communication unit 13, determines whether the communication with the local-area radio network has been established.

By the way, in the step S801, when the radio communication device 1 moves into the range of second local-area radio network while the second communication unit 13 is operated to communicate with first local-area radio network, the radio communication device 1 can determines whether a new communication with the second local-area radio network has been established.

If it is determined in step S801 that the radio communication device 1 has not established the communication with the local-area radio network yet (S801: NO), the radio communication device 1 repeats the processing of the step S801 under the control of the controller 10.

Before repeating the processing of the step S801, the processing may be on standby for a predetermined time.

If it is determined in step S801 that the radio communication device 1 has been established the communication with the local-area radio network (S801: YES), the radio communication device 1 activates the first communication unit 12 by the processing of the operation controller 100 based on the control of the controller 10.

For example, the operation controller 100 causes the radio communication device 1 to distribute power to the first communication unit 12 to operate the first communication unit 12.

Furthermore, by activating the first communication unit 12, the execution of the processing associated with the first communication unit 12 is started in parallel to the processing associated with the second communication unit 13.

Under the control of the controller 10, the radio communication device 1 obtains the position information representing the present position recorded in the present position information recording unit 110 (S803).

The radio communication device 1 stops the first communication unit 12 by the processing of the operation controller 100.

The steps S802 to S803 are same as the steps S104 to S105 associated with the first embodiment.

The radio communication device 1 retrieves the communication set information and the channel information associated with the position information obtained in the processing of the step S803 from the communication table 114 of the recording unit 11 (S805).

The communication table 114 includes the communication set information, the channel information, and the position information as illustrated in FIG. 10. That is, the communication set information, the channel information, and the position information are corresponding to each other by the communication table 114.

The communication table 114 may include plural communication set information corresponding to one position information. The communication table 114 may include plural channel information corresponding to one position information. The channel information may include plural channel numbers, as illustrated in FIG. 10. In such case, using one of the channel numbers included in the channel information, the radio communication communicates with the fixed station AP associated with the local-area radio network.

The radio communication device 1 determines whether the communication set information associated with the position information obtained in the processing of the step S803 is included in the communication table 114, on the basis of the result of the processing of the step S805 (S806).

If it is determined in the step S806 that the communication set information associated with the position information obtained in the processing of the step S803 has not been recorded in the communication table 114 yet (S806: NO), the radio communication device 1 executes a updating processing for the communication table 114.

In the step S807, the radio communication device 1 obtains the communication set information and the channel information that have been used in the establishment of the communication with the local-area radio network.

Furthermore, the radio communication device 1 updates the communication table 114 of the recording unit 11 by using the record that includes both the position information obtained in the step S803 and the obtained communication set information (and the channel information) (S807).

With the processing of the step S803, the communication table 114 includes the communication set information (and the channel information) associated with the position information obtained in the step S803.

The radio communication device 1 records the communication set information associated with the position information obtained in the processing of the step S803 into the scanning communication set information recording unit 113 (S808).

If it is determined in the step S806 that the position information and the communication set information has been recorded in the communication table 114 in association with each other (S806: YES), the radio communication device 1 executes the processing of the step S808 and subsequent steps without executing the processing of the step S807.

The radio communication device 1 determines whether the signal level of received signal from the fixed station AP associated with the local-area radio network with which the radio communication device 1 has established the communication is less than a threshold level (changeover reference value) for switching the local-area radio network, by the control of controller 10 (S809).

The threshold level in the processing of the step S809 is greater than a threshold level in the processing of the step S810.

If it is determined in the step S809 that the signal level of received signal form the fixed station AP is not less than the threshold level (S809: NO), the radio communication device 1 repeats the step S809 by the control of controller 10.

If it is determined in the step S809 that the signal level of received signal form the fixed station AP is less than the threshold level (S809: YES), the radio communication device 1 determines whether it is within the communication range of the local-area radio network associated with the connected fixed station AP on the basis of the communication set information (S810).

For example, in the step S810, the radio communication device 1 determines whether the signal level of received signal from the fixed station AP associated with the local-area radio network with which the radio communication device 1 has established the communication is less than a threshold level (a network-accessible threshold level) necessary to exchange data with the local-area radio network.

If it is determined in the step S810 that the radio communication device 1 is within the communication range of the local-area radio network (S810: NO), the radio communication device 1 obtains the communication set information (and the channel information) that the radio communication device 1 uses in scanning operations to detect a connectable local-area radio network (S811), by the processing of the communication setting reading unit 104 based on the control of the controller 10.

The radio communication device 1 executes the scanning operations on the basis of the communication set information (and the channel information) obtained in the step S811, by the processing of the scanning unit 105 based on the control of the controller 10 (S812).

In addition, the radio communication device 1 determines whether a connectable local-area radio network except for the local-area radio network with which the radio communication device 1 has established the communication can be detected or not, by the processing of the scanning unit 105 based on the control of the controller 10 (S813).

The processing of the step S811 to S813 are same as the processing of the step S109 to S111 associated with the first embodiment.

In the step S812, with the second communication unit 13 communicating with the local-area radio network with which the radio communication device 1 has established the communication, the radio communication device 1 may execute the scanning operation to detect a connectable local-area radio network.

In the step S813, if the radio communication device 1 detects connectable local-area radio networks (S813: YES), the radio communication device 1 compares the signal level of the received signal form the fixed station AP associated with the local-area radio network with which the radio communication device 1 has established and the signal level of received signals from fixed stations AP associated with each connectable local-area radio communication detected in the processing of the step S813 (S814).

In other words, the radio communication device 1 determines whether the signal level of the received signal form the fixed station AP associated with the local-area radio network with which the radio communication device 1 has established is not less than the signal level of received signals from fixed stations AP associated with each connectable local-area radio communication detected in the processing of the step S813, by the control of the controller 10 (S814).

If plural fixed stations AP and/or channels are detected in the processing of the step S813, the strongest signal level of the received signal from the fixed stations AP in the channel is compared.

If it is determined in the step S814 that the signal level of the received signal form the fixed station AP associated with the local-area radio network with which the radio communication device 1 has established is less than the signal level of received signals from fixed stations AP associated with each connectable local-area radio communication detected in the processing of the step S813 (S814: NO), the radio communication device 1 executes a switching processing, by the control of controller 10(S815).

In the processing of the step S815, the radio communication device 1 stops the communication with connected the fixed station AP associated with the local-area radio network, and establishes a communication with the connectable local-area radio network from which the radio communication device 1 receives the strongest signal level.

The radio communication 1 returns the processing to the step S802, and executes the processing to the step S802 and the subsequent processing, by the control of the controller 10.

After the processing of the step S815, the radio communication device 1 may return the processing to the step S801. In other words, before executing the processing of the step S802, the radio communication device 1 may determine whether the device 1 has succeeded in the establishment in the processing of the step S815 (S801).

If it is determined in the step S814 that the signal level of the received signal form the fixed station AP associated with the local-area radio network with which the radio communication device 1 has established is not less than the signal level of received signals from fixed stations AP associated with each connectable local-area radio communication detected in the processing of the step S813 (S814: YES), the radio communication device 1 returns the processing to the step S809 to execute the processing of the step S809 and subsequent processing.

To respond quickly and flexibly to changing condition of the communication with the local-area radio network with maintenance of good condition of communication with the connected local-area radio network, the radio communication device 1 executes repeatedly the processing of the step S809 to S814.

In the step S813, if the radio communication device doesn't detect connectable local-area radio networks (S813: NO), the radio communication device 1 returns the processing to the step S809 to executes the processing of the step S809 and the subsequent processing, by the control of controller 10.

If it is determined in the step S810 that the radio communication device 1 is outside the communication range of the local-area radio network (S810: YES), the radio communication device 1 executes the processing of the step S104 to S114 associated with the first embodiment illustrated in FIG. 7.

In the first embodiment, the radio communication device 1 returns the processing to the step S101 after the processing of the step S113.

In the seventh embodiment, however, the radio communication device 1 returns the processing to the step S801 after the processing of the step S113.

Furthermore, the radio communication device 1 associated with the seventh embodiment may be properly designed in accordance with an application.

For example, the radio communication device 1 according to the seventh embodiment may return the processing to the step S802 after establishing the communication with the fixed station AP associated with the local-area radio communication in the processing of the step S112.

The processes associated with the first communication unit 12 of the radio communication device 1 in the seventh embodiment are same as the processes in the first embodiment, and thus the description thereof is omitted because the first embodiment may be referred to.

According to the above description about the seventh embodiment, the steps S803 to S808 are processed when the radio communication device 1 is within the communication range of the local-area communication with which the radio communication device 1 has been established the communication.

In other words, the radio communication device 1 in the seventh embodiment obtains the communication set information while the radio communication device 1 continues connecting to the local-area radio network established in the processing of the step S801.

Hence, the radio communication device 1 can execute quickly the scanning operation when the radio communication device 1 determines that the signal level of received signal from the fixed station AP associated with the local-area radio network with which the radio communication device 1 has established the communication is less than a threshold level for switching the local-area radio network.

The constructions of the radio communication device 1 in the seventh embodiment can be adapted to the radio communication device 1 in the first to sixth embodiments. In other words, the first to seventh embodiments may be implemented in combination.

The first to seventh embodiments are not necessarily implemented independently of one another, and they may be implemented in combination.

For example, the seventh embodiment may be adapted to the fourth embodiment.

In such case, the radio communication device 1, after determining the communication with the local-area radio network is in difficult state, executes intermittently the scanning operation associated with the local-area radio network.

Furthermore, the radio communication device 1 may be designed the way that the interval of the scanning operation increases step by step, such as from 5 sec to 5 minutes.

Furthermore, the first to seventh embodiments are merely examples of an indefinitely large number of embodiments of the present invention, and the constructions of the respective hardware, software, etc. may be properly designed in accordance with an application.

That is, the first to seventh embodiments may be developed in various styles insofar as they scan the local-area radio network on the basis of the position information of the wide-area radio network.

Accordingly, the wide-area radio network is not limited to a public cellular phone network if it is a radio communication network having a base station transmitting position information, and other radio communication networks such as PHS network, etc. may be used.

Furthermore, with respect to the local-area radio network, various radio communication networks such as a radio communication network for executing communication defined by Bluetooth (registered trademark) may be used. With the above configuration, the communication costs in a single mode where the radio communication device is connected to only the local-area radio network, for example, a power consumption required for communication can be reduced.

With above configuration, when the radio communication device operates in the single mode where processing associated to the communication over the local-area radio network is executed, and processing associated with the communication over the wide-area radio communication network stops, since scanning based on all of the recorded communication set information is unnecessary when the radio communication device is outside the communication range of the local-area radio network, there is advantageous in that a communication power required for scanning can be reduced, and so on.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A radio communication device, comprising:
   a first communication unit connectable to a wide-area radio network through a base station that transmits position information of the base station;
   a second communication unit connected to a local-area radio network through a fixed station based on communication set information representing a communication setting associated with the local-area radio network;
   a recording unit that records communication set information and position information of a base station obtained at a position connectable to a local-area radio network associated with the communication set information;
   a communication determination unit that determines whether a connection between the radio communication device and a local-area radio network is in a difficult state while the radio communication device operates in a communication mode in which the radio communication device is connected to the local-area radio network by the second communication unit;

a position information obtaining unit that obtains position information from a base station that is configured to communicate through the first communication unit;

a communication setting reading unit that reads out communication set information recorded in the recording unit associated with the position information obtained by the position information obtaining unit; and a scanning unit that detects a connectable local-area radio network based on the communication set information read out by the communication setting reading unit when the communication determination unit determines that a connection between the radio communication device and a local-area radio network is in the difficult state.

2. The radio communication device according to claim 1, further comprising:

a stop unit that stops the second communication unit when the communication set information associated with the position information obtained by the position information obtaining unit is not recorded in the recording unit.

3. The radio communication device according to claim 1, wherein the communication set information includes channel information indicating a communication channel associated with communication, and wherein the recording unit records channel information being used in association with the communication set information.

4. The radio communication device according to claim 1, further comprising:

a determining unit that determines whether the position information obtained by the position information obtaining unit is recorded in the recording unit in association with the communication set information associated with a connection-impossible local-area radio network, wherein when the determining unit determines that the position information is not recorded in the recording unit, the recording unit records the communication set information associated with the connection-impossible local-area radio network and the obtained position information in association with each other.

5. The radio communication device according to claim 1, wherein the scanning unit intermittently detects a connectable local-area radio network, a detecting interval being associated with the intermittent detecting is set so as to be stepwise lengthened from a preset minimum interval to a preset maximum interval after the connection with the local-area radio network becomes impossible, or the intermittent detecting at the maximum interval is started when the position information obtained by the position information obtaining unit is changed and the communication set information associated with the changed position information is recorded in the recording unit after the connection to the local-area radio network becomes difficult.

6. A radio communication device comprising:

a first communication unit connectable to a wide-area radio network through a base station that transmits position information of the base station;

a second communication unit connected to a local-area radio network through a fixed station based on communication set information representing a communication setting associated with the local-area radio network;

a recording unit that records communication set information and position information obtained from the base station at a position connectable to a local-area radio network associated with the communication set information;

a communication determination unit that determines whether a connection between the radio communication device and a local-area radio network is in a difficult state while the radio communication device operates in a communication mode in which the radio communication device is connected to the local-area radio network by the second communication unit;

a position information obtaining unit that obtains the position information recorded in the recording unit associated with the communication set information associated with the connected local-area radio network;

a communication setting reading unit that reads out communication set information recorded in the recording unit associated with the position information obtained by the position information obtaining unit; and a scanning unit that detects a connectable local-area radio network based on the communication set information read out by the communication setting reading unit when the communication determination unit determines that a connection between the radio communication device and a local-area radio network is in the difficult state.

7. The radio communication device according to claim 6, wherein the scanning unit detects the connectable local-area radio network based on all the communication set information recorded in the recording unit after detecting the local-area radio network associated with the communication set information recorded in the recording unit in association with the position information obtained by the position information obtaining unit for a given time.

8. A radio communication device comprising:

a first communication unit connected to a wide-area radio network through a base station that transmits position information associated with a position of the base station;

a second communication unit connected to a local-area radio network through a fixed station based on communication set information representing a communication setting associated with the local-area radio network;

a recording unit that records communication set information and position information obtained from the base station at a position connectable to a local-area radio network associated with the communication set information;

a communication determination unit that determines whether a connection between the radio communication device and a local-area radio network is in a difficult state while the radio communication device operates in a communication mode in which the radio communication device is connected to the local-area radio network by the second communication unit;

a position information obtaining unit that obtains the position information recorded in the recording unit in association with the communication set information associated with the connected local-area radio network;

a communication setting reading unit that reads out communication set information recorded in the recording unit in association with the position information obtained by the position information obtaining unit; and a scanning unit that detects a connectable local-area radio network when the communication determination unit determines that a connection between the radio communication device and a local-area radio network is in the difficult state, wherein the scanning unit executes a first detecting operation for detecting the connected local-area radio network, executes a second scanning operation for scanning the connectable local-area radio network based on the communication set information recorded in the recording unit in association with the obtained position information after the first scanning operation, and executes a third scanning operation for scanning the connectable local-area radio network based on all the communication set information recorded in the recording unit after the second scanning operation.

9. A radio communication method executed by a radio communication device comprising a first communication unit configured to be connected to a wide-area radio network through a base station transmitting position information associated with a position of the base station, and a second communication unit configured to be connected to a local-area radio network through a fixed station on the basis of communication set information representing a communication setting associated with the local-area radio network, the radio communication method comprising:

starting up the first communication unit when the connection between the radio communication device and a local-area radio network to be connected becomes impossible under a state that the radio communication device operates in a communication mode in which the radio communication device is connected to a local-area radio network through the second communication unit;

obtaining position information from a communication-possible base station through the started first communication unit;

reading out communication set information recorded in association with the obtained position information from a recording unit that records communication set information and position information obtained from the base station at a position connectable to the local-area radio network associated with the communication set information; and detecting a connectable local-area radio network on the basis of the communication set information read out.

10. A non-transitory computer-readable medium storing a radio communication program that causes a computer having a first communication unit configured to be connected to a wide-area radio network through a base station transmitting position information associated with a position of the base station, a second communication unit configured to be connected to a local-area radio network through a fixed station on the basis of communication set information representing a communication setting associated with the local-area radio network, and a recording unit that records communication set information and the position information obtained from the base station at a position connectable to the local-area radio network to execute a process, the process comprising:

determining whether a connection between the radio communication device and a local-area radio network is in a difficult state while the radio communication device operates in a communication mode in which the radio communication device is connected to the local-area radio network by the second communication unit;

obtaining position information from a communication-possible base station through the first communication unit;

reading out communication set information recorded in association with the obtained position information from the recording unit; and detecting a connectable local-area radio network on the basis of the communication set information read out when the communication determination unit determines that a connection between the radio communication device and a local-area radio network is in the difficult state.

* * * * *

UNITED STATES PATENT AND TRADEMARK OFFICE
CERTIFICATE OF CORRECTION

| | |
|---|---|
| PATENT NO. | : 8,189,550 B2 |
| APPLICATION NO. | : 12/412872 |
| DATED | : May 29, 2012 |
| INVENTOR(S) | : Yasushi Hara et al. |

It is certified that error appears in the above-identified patent and that said Letters Patent is hereby corrected as shown below:

Column 32, Line 18, In Claim 10, delete "network" and insert -- network, --, therefor.

Signed and Sealed this
Seventh Day of August, 2012

David J. Kappos
*Director of the United States Patent and Trademark Office*